United States Patent
Mukai et al.

(10) Patent No.: US 9,001,420 B2
(45) Date of Patent: Apr. 7, 2015

(54) MICROSCOPE OPTICAL SYSTEM AND MICROSCOPE SYSTEM

(71) Applicant: Nikon Corporation, Tokyo (JP)

(72) Inventors: Kaori Mukai, Tokyo (JP); Miwako Yoshida, Yokohama (JP)

(73) Assignee: Nikon Corporation, Tokyo (JP)

( * ) Notice: Subject to any disclaimer, the term of this patent is extended or adjusted under 35 U.S.C. 154(b) by 224 days.

(21) Appl. No.: 13/775,486

(22) Filed: Feb. 25, 2013

(65) Prior Publication Data

US 2013/0170021 A1 Jul. 4, 2013

Related U.S. Application Data

(63) Continuation of application No. PCT/JP2011/068647, filed on Aug. 18, 2011.

(30) Foreign Application Priority Data

Aug. 25, 2010 (JP) ................................. 2010-187828

(51) Int. Cl.
*G02B 21/02* (2006.01)
*G02B 27/42* (2006.01)

(52) U.S. Cl.
CPC ............ *G02B 21/02* (2013.01); *G02B 27/4205* (2013.01); *G02B 27/4211* (2013.01)

(58) Field of Classification Search
CPC ........................... G02B 21/02; G02B 27/4205
USPC .......................................... 359/368, 566, 576
See application file for complete search history.

(56) References Cited

U.S. PATENT DOCUMENTS

| 2002/0131165 A1 | 9/2002 | Takahama |
| 2003/0223107 A1 * | 12/2003 | Olszak et al. ................. 359/389 |
| 2004/0070846 A1 * | 4/2004 | Dobschal et al. ............. 359/795 |
| 2004/0174607 A1 * | 9/2004 | Brunner et al. ............... 359/642 |

(Continued)

FOREIGN PATENT DOCUMENTS

| CN | 1375719 A | 10/2002 |
| JP | A-5-27179 | 2/1993 |

(Continued)

OTHER PUBLICATIONS

Chinese Office Action issued in Chinese Patent Application No. 201180031600.9 on Sep. 3, 2014 (with translation).

(Continued)

*Primary Examiner* — Frank Font
(74) *Attorney, Agent, or Firm* — Oliff PLC

(57) ABSTRACT

Provided is a microscope optical system in which the occurrence of flare due to unnecessary-order diffracted light exited from a diffractive optical element is suppressed. A microscope objective lens MS is configured by including an objective lens OL which has a diffractive optical element GD and converts light from an object into a substantially parallel light flux, and a second objective lens IL which forms an image of the object by focusing the substantially parallel light flux from the objective lens OL, and is configured such that, in case where an m-th order of diffracted light from the diffractive optical element GD is used for the image formation, the following expression is satisfied: $|\theta|>\tan^{-1}(0.06/D)$ when the light of a maximum NA emitted from the object located on an optical axis enters the diffractive optical element.

10 Claims, 15 Drawing Sheets

(56) References Cited

U.S. PATENT DOCUMENTS

| | | | |
|---|---|---|---|
| 2004/0252380 A1* | 12/2004 | Kashima | 359/656 |
| 2005/0036204 A1* | 2/2005 | Okamura | 359/569 |
| 2008/0158668 A1* | 7/2008 | Ouchi et al. | 359/385 |
| 2009/0225407 A1* | 9/2009 | Nakayama et al. | 359/370 |
| 2010/0141750 A1* | 6/2010 | Osawa et al. | 348/79 |
| 2010/0195199 A1* | 8/2010 | Tamura | |
| 2011/0102899 A1* | 5/2011 | Taeko et al. | 359/576 |
| 2011/0174962 A1* | 7/2011 | Bockelmann et al. | 250/251 |
| 2013/0271829 A1* | 10/2013 | Kasahara | 359/385 |

FOREIGN PATENT DOCUMENTS

| | | |
|---|---|---|
| JP | A-11-95174 | 4/1999 |
| JP | A-11-125709 | 5/1999 |
| JP | A-2009-251554 | 10/2009 |
| WO | WO 2009/125778 A1 | 10/2009 |

OTHER PUBLICATIONS

Nov. 15, 2011 International Search Report issued in International Patent Application No. PCT/JP2011/068647 (with Translation).

Japanese Office Action issued in Japanese Patent Application No. 2012-530636 on Sep. 5, 2013 (with translation).

Japanese Office Action issued in Japanese Patent Application No. 2012-530636 on Apr. 1, 2014 (with translation).

Extended European Search Report issued in European Patent Application No. 11819842.3 on Apr. 9, 2014.

International Preliminary Report on Patentability issued in International Application No. PCT/JP2011/068647 on Feb. 26, 2013 (with translation).

* cited by examiner

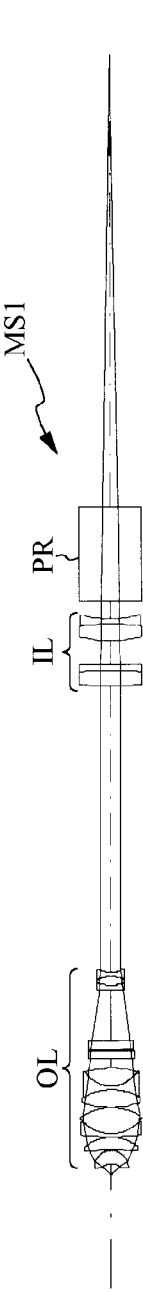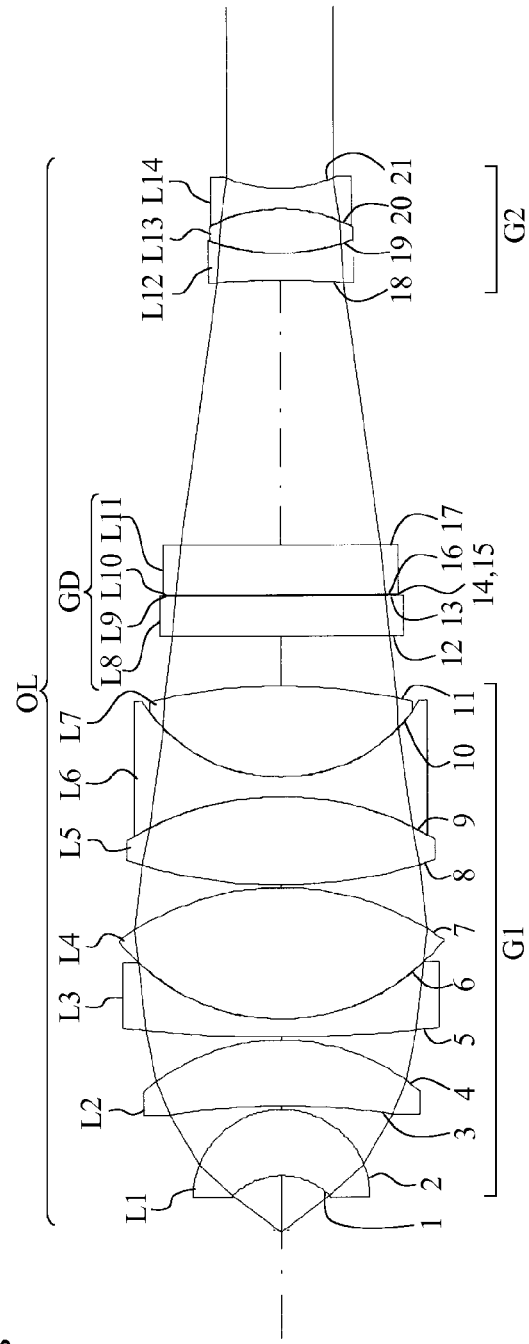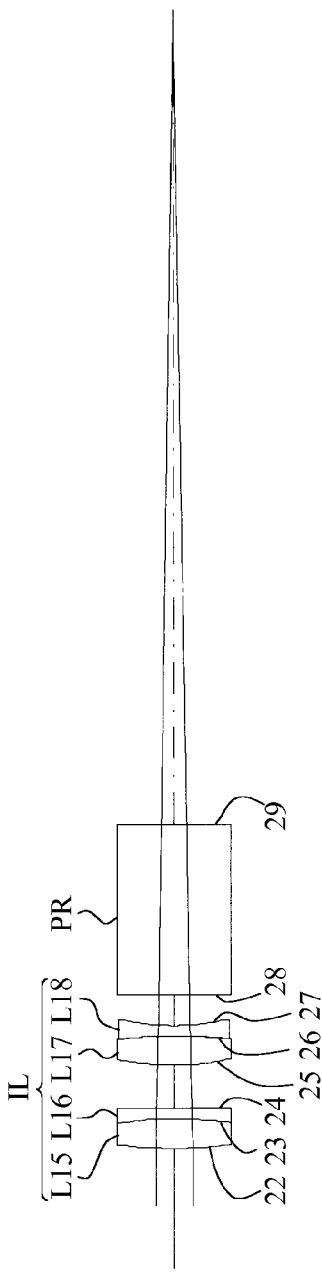
FIG. 4A
FIG. 4B
FIG. 4C

FIG. 5A ZERO-ORDER DIFFRACTED LIGHT
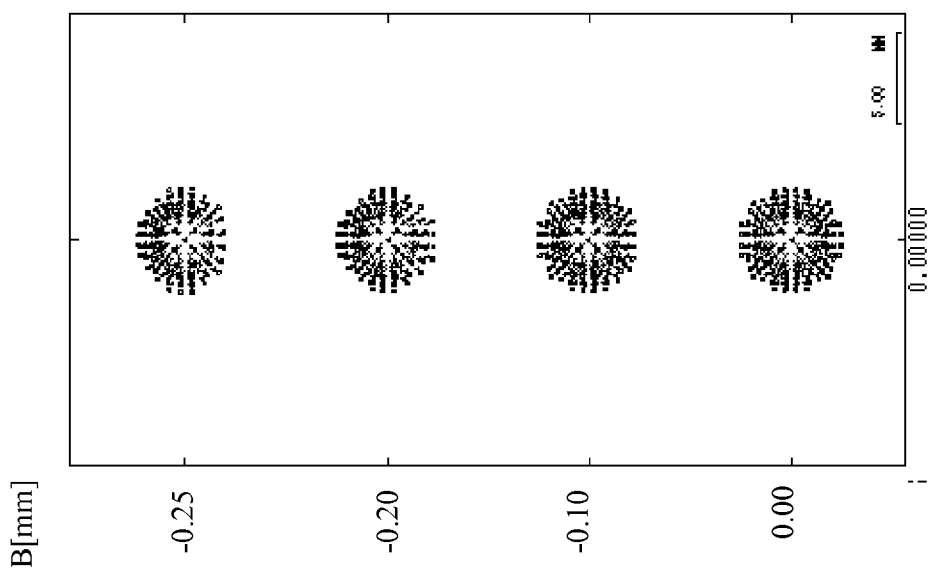
FIG. 5B SECOND-ORDER DIFFRACTED LIGHT
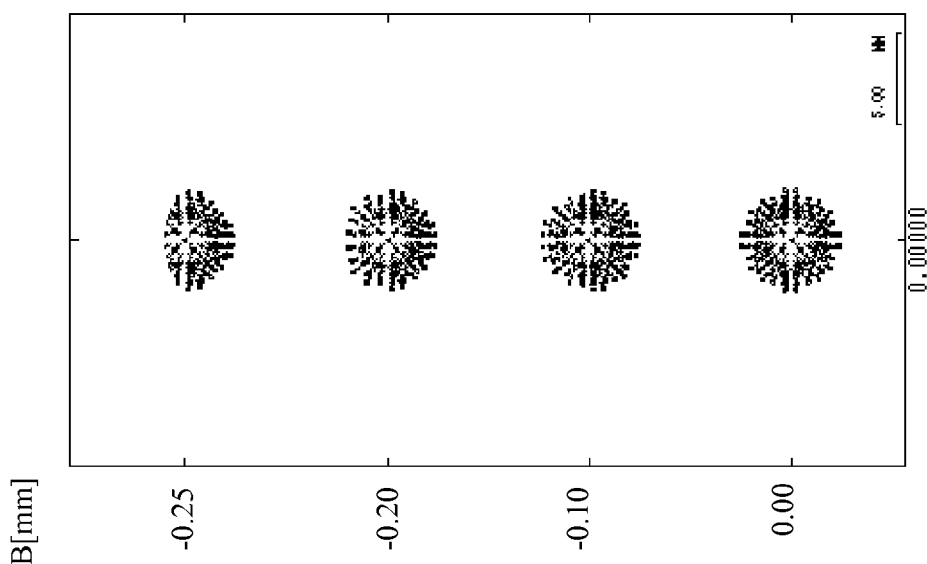

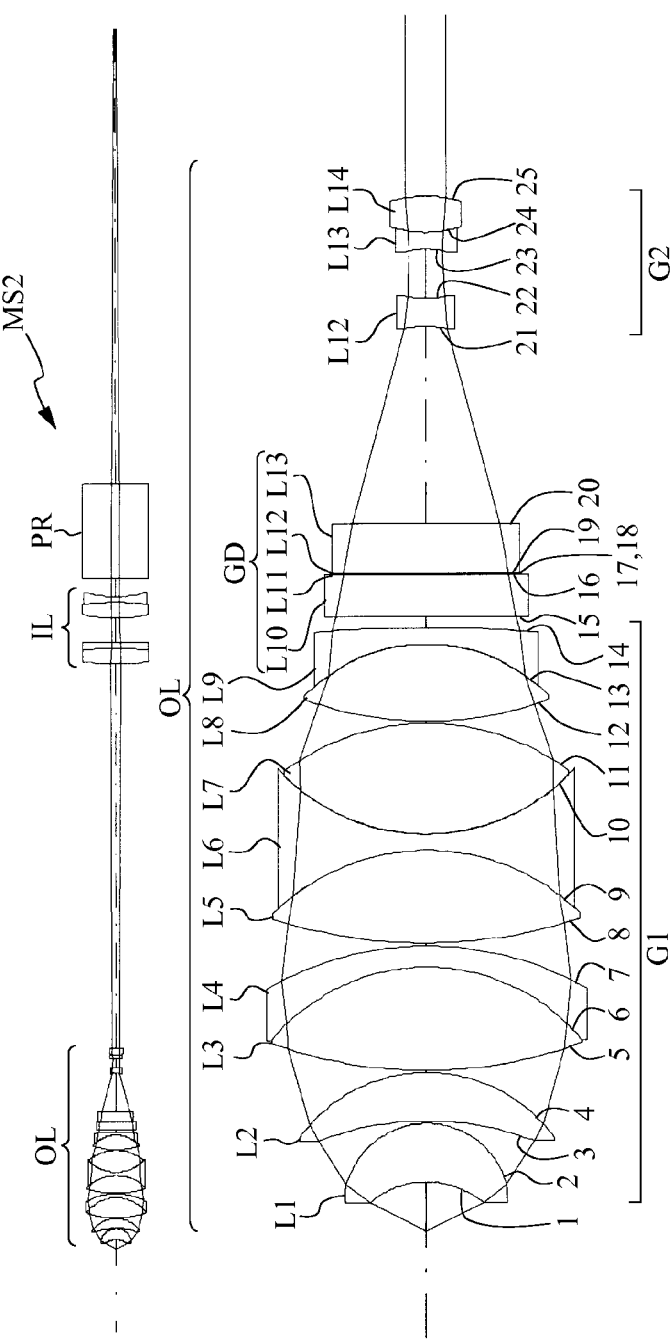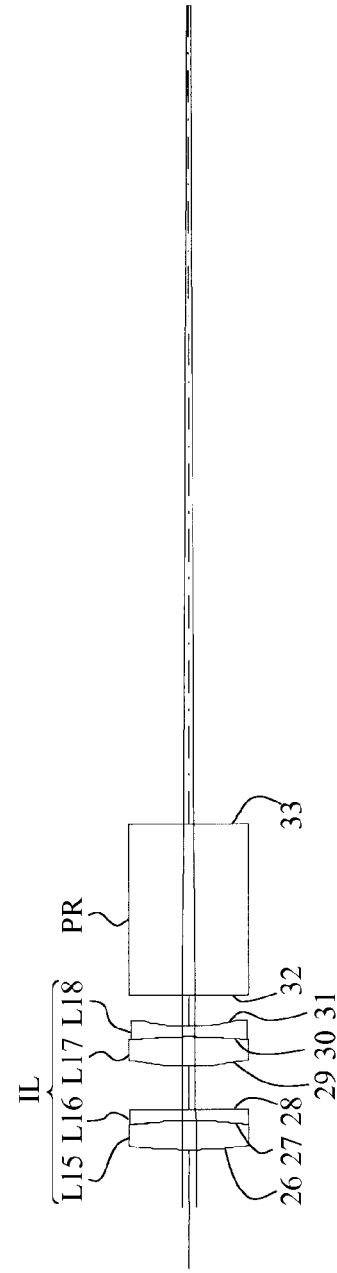

SECOND-ORDER DIFFRACTED LIGHT

ZERO-ORDER DIFFRACTED LIGHT

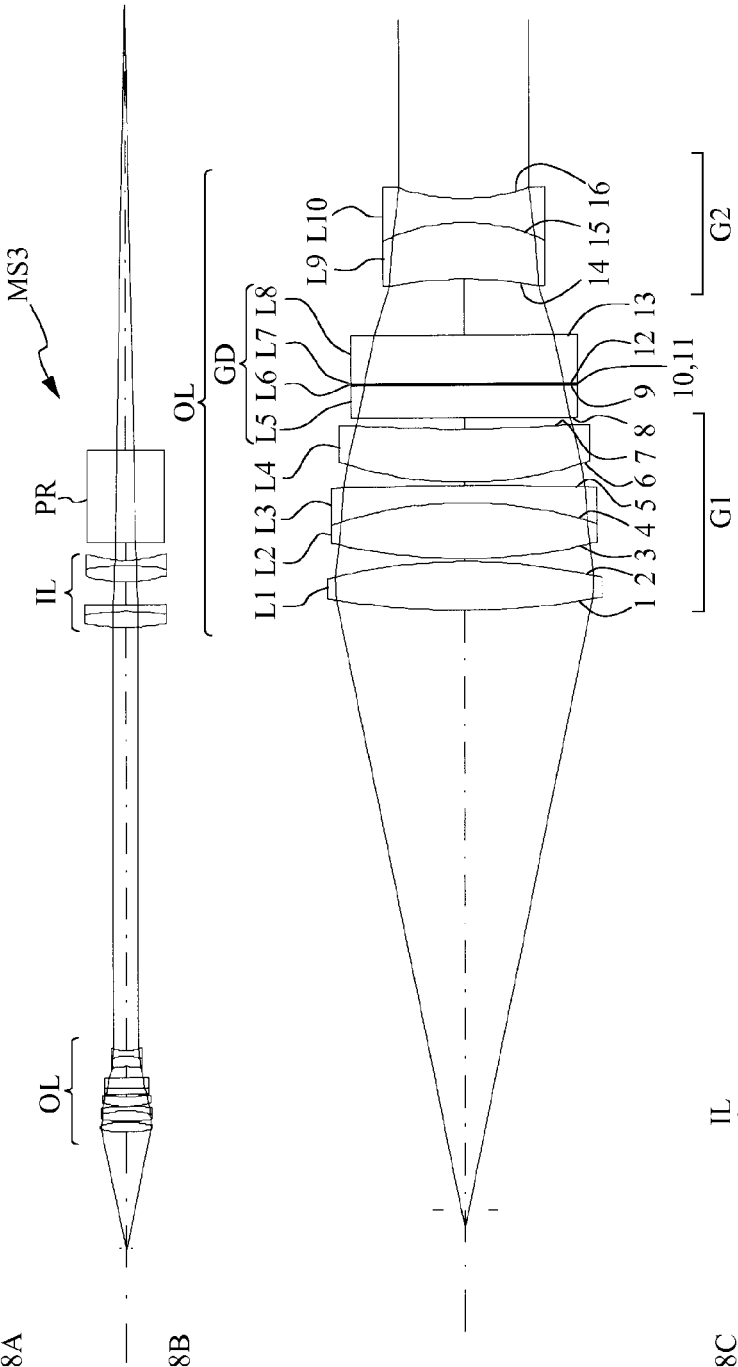
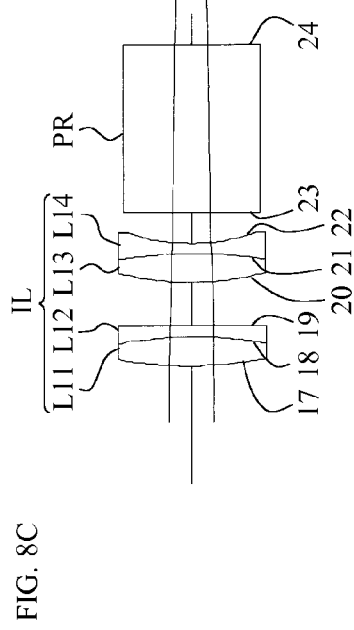
FIG. 8A
FIG. 8B
FIG. 8C

ZERO-ORDER DIFFRACTED LIGHT

SECOND-ORDER DIFFRACTED LIGHT

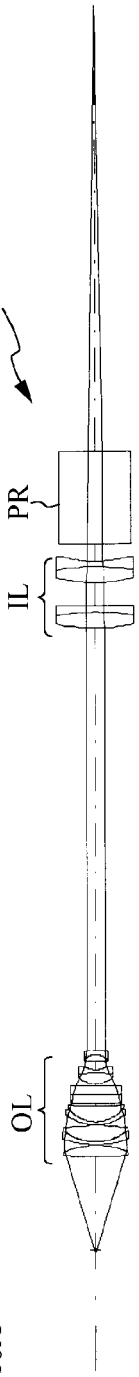
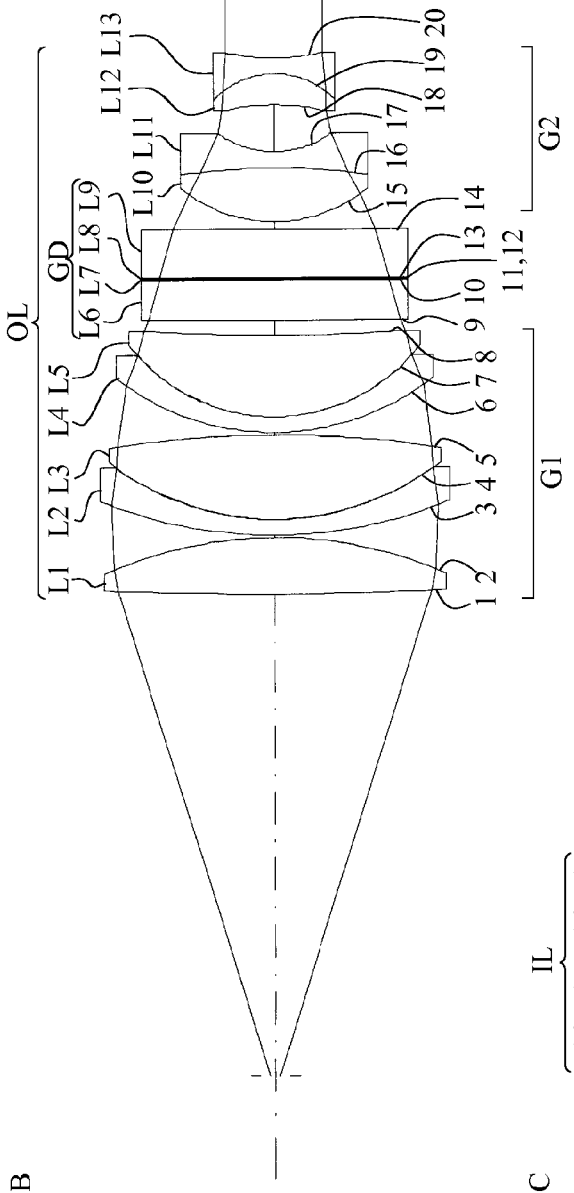
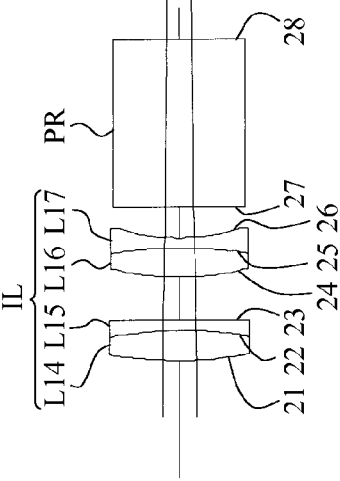
FIG. 10A
FIG. 10B
FIG. 10C

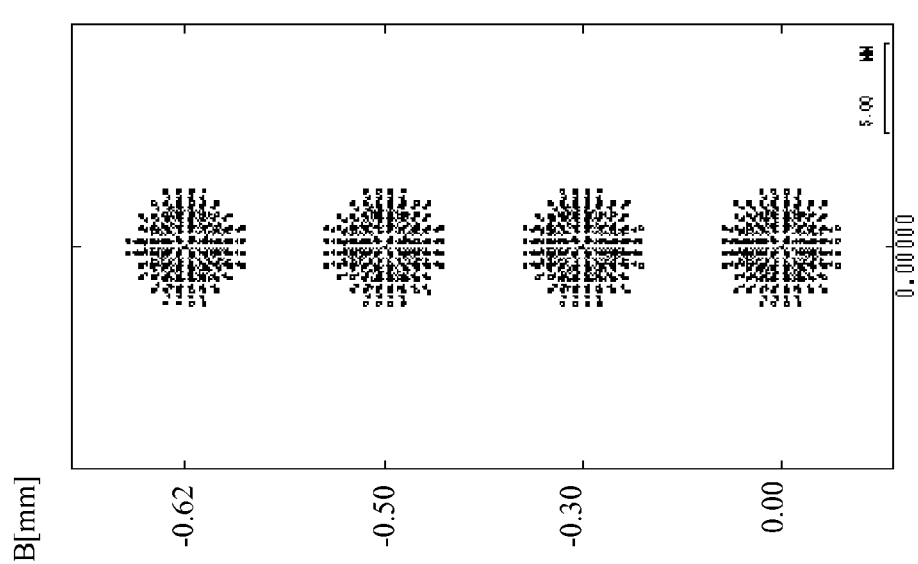
FIG. 11B SECOND-ORDER DIFFRACTED LIGHT
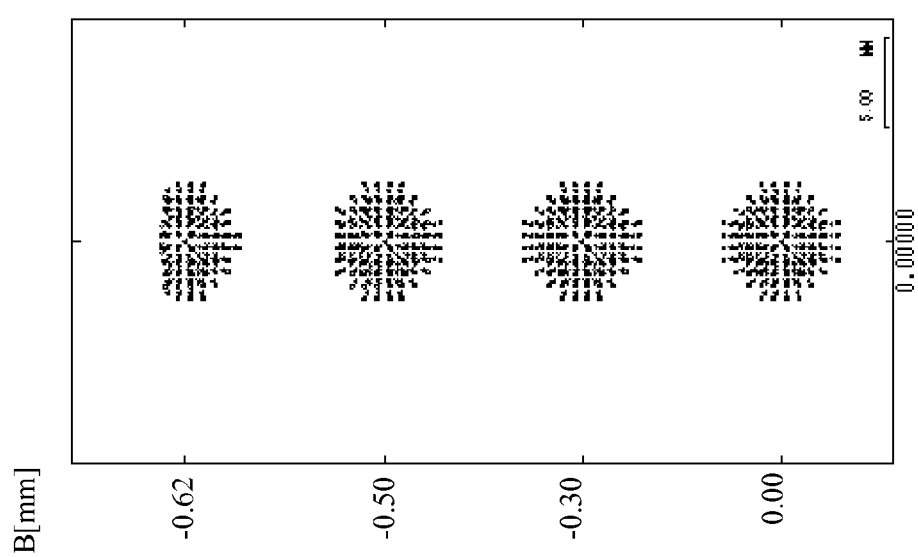
FIG. 11A ZERO-ORDER DIFFRACTED LIGHT

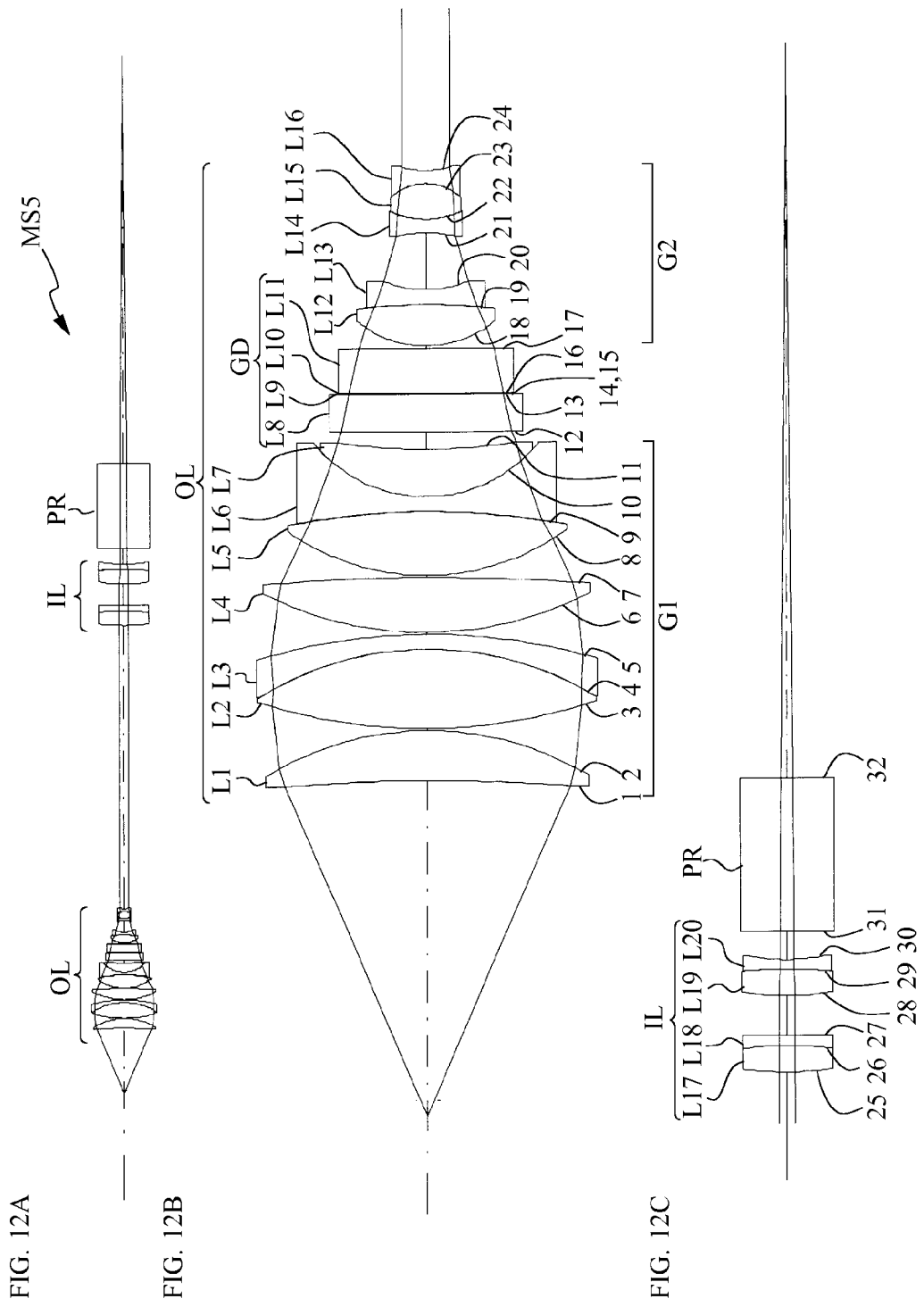

ZERO-ORDER DIFFRACTED LIGHT

SECOND-ORDER DIFFRACTED LIGHT

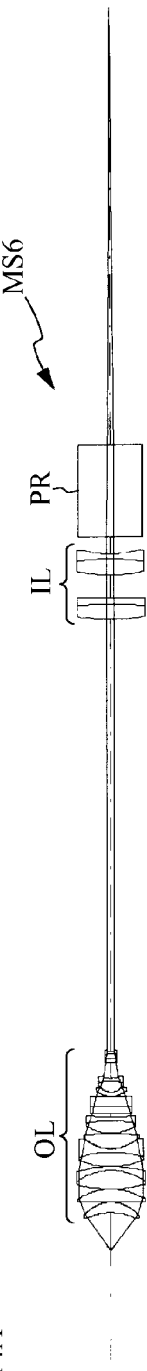
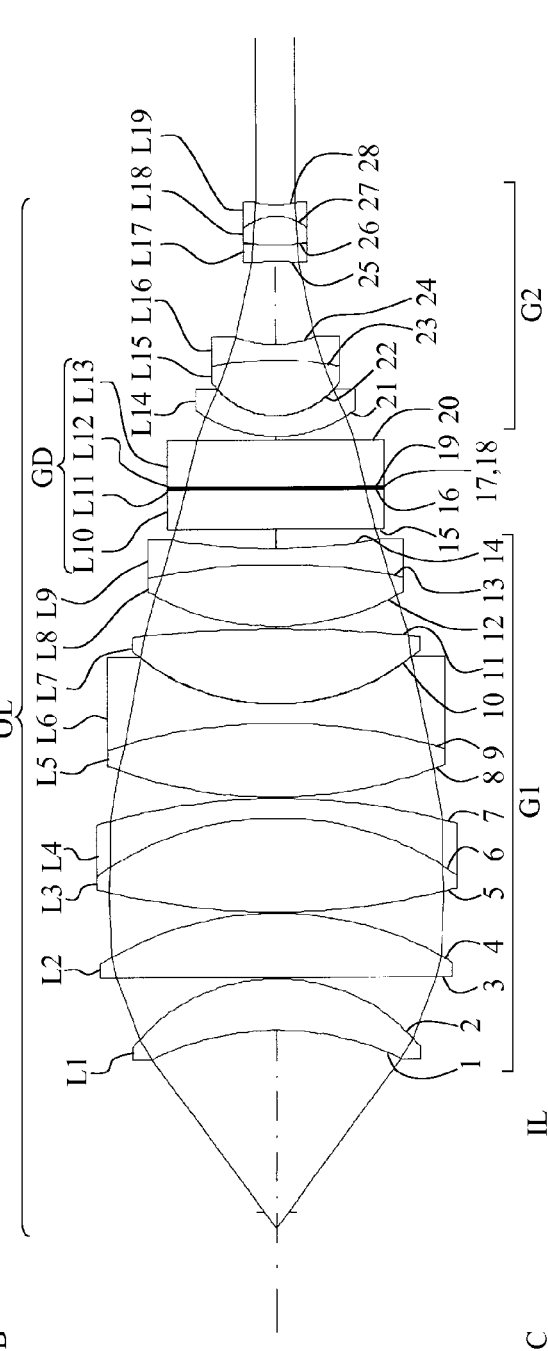
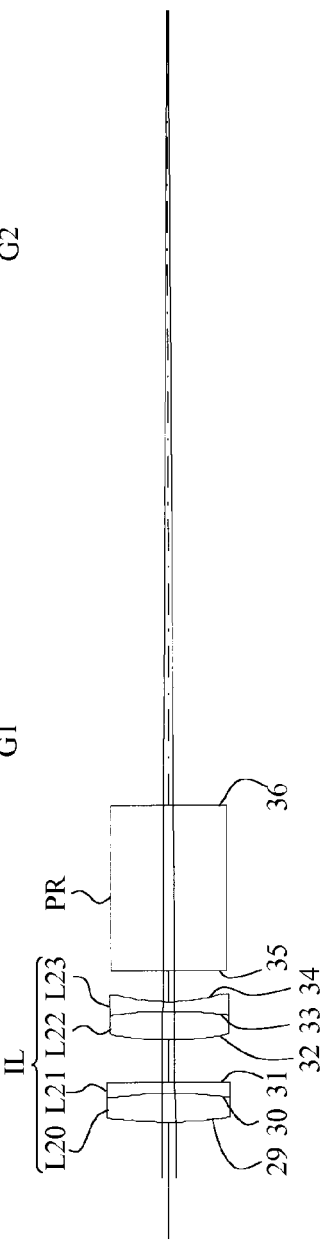
FIG. 14A
FIG. 14B
FIG. 14C

SECOND-ORDER DIFFRACTED LIGHT

ZERO-ORDER DIFFRACTED LIGHT

MICROSCOPE OPTICAL SYSTEM AND MICROSCOPE SYSTEM

This is a Continuation of International Application No. PCT/JP2011/068647 filed Aug. 18, 2011, which claims priority to Japanese Patent Application No. 2010-187828 filed Aug. 25, 2010. The disclosure of the prior application is hereby incorporated by reference herein in its entirety.

TECHNICAL FIELD

The present invention relates to a microscope optical system and a microscope system using the microscope optical system.

BACKGROUND ART

Use of a diffractive optical element in a microscope optical system provides advantages in chromatic aberration correction, and the like, over the prior art, and makes if possible to design a low-cost microscope objective lens with high optical performance. However, when a diffractive optical element is used in a microscope optical system, not only the order of diffracted light contributing to the image formation but also the other orders of diffracted light (hereinafter referred to as "unnecessary-order diffracted light") pass through the microscope objective lens, and hence flare is caused. It is known that, in order to obscure the flare caused by the unnecessary-order diffracted light exited from the diffractive optical element, it is only necessary to increase the size of the spot, which is formed on the image surface by the unnecessary-order diffracted light (see, for example, Patent Literature 1).

CITATION LIST

[Patent Literature]
[Patent Literature 1] Japanese Patent Laid-Open No. 11-125709

SUMMARY OF INVENTION

Technical Problem

However, in the case where a diffractive optical element is used for the objective lens of a microscope optical system, there has been a problem that, the occurrence of flare due to the unnecessary-order diffracted light exited from the diffractive optical element cannot be effectively suppressed unless the design is made in consideration of the nature of the microscope optical system.

The present invention has been made in view of the above described circumstances. An object of the present invention is to provide a microscope optical system suppressing the occurrence of flare due to the unnecessary-order diffracted light exited from the diffractive optical element, and to provide a microscope system using the microscope optical system.

Solution to Problem

In order to solve the above-described problem, a microscope optical system, according to a first aspect of the present invention, is featured by including an objective lens which has a diffractive optical element and converts light from an object into a substantially parallel light flux, and a second objective lens which forms an image of the object by focusing the substantially parallel light flux from the objective lens, and is featured in that, in case where an m-th order diffracted light from the diffractive optical element is used for the image formation, the following expression is satisfied:

$$|\theta| > \tan^{-1}(0.06/D) \qquad \text{[Expression 1]}$$

when the light of a maximum NA emitted from the object located on an optical axis enters the diffractive optical element, where $\theta$ is the incident angle on the second objective lens of the diffracted light having an order of diffraction different from the order of the m-th order diffracted light from the diffractive optical element, and D [mm] is the diameter of the entrance pupil to the second objective lens.

Further, a microscope optical system, according to a second aspect of the present invention, is featured by including an objective lens which has a diffractive optical element and converts light from an object into a substantially parallel light flux, and a second objective lens which forms an image of the object by focusing the substantially parallel light flux from the objective lens, and is featured in that the following expression is satisfied:

[Expression 2]
$$|\delta\theta| > \left| \frac{0.054}{hdoe} \frac{f1}{D} \cos(\theta doe)\sin(\theta doe) \right|$$

where, among a plurality of orders of diffracted light from the diffractive optical element when the light of the maximum NA emitted from the object located on an optical axis enters the diffractive optical element, $\delta\theta$ is the difference between the output angle of the necessary-order diffracted light used for the image formation and the output angle of the unnecessary-order diffracted light; h is the height at which the necessary-order diffracted light used for the image formation exits; $\theta$doe is the output angle of the necessary-order diffracted light used for the image formation; D [mm] is the diameter of the entrance pupil to the second objective lens; and f1 is the focal length of the group of lenses, which are included in the objective lens, which are arranged on the image side from the diffractive optical element.

Further, in the microscope optical system, it is preferred that the diffractive optical element is a contact multi-layered diffractive optical element.

Further, in the microscope optical system, it is preferred that a diffraction grating pattern of the diffractive optical element is formed on the bonded surface of resin layers each having a different refractive index and each of the resin layers is arranged on a planar substrate.

In the microscope optical system, it is preferred that the group of lenses, which are included in the objective lens, which are arranged on the image side from the diffractive optical element, have negative refractive power.

Further, a microscope system according to the present invention is featured by including a stage on which an object is mounted, an illumination optical system which illuminates the object, and any one of the above-described microscope optical systems, each of which forms an image of the object.

Advantageous Effects of Invention

When the present invention is configured, as described above, it is possible to provide a microscope optical system suppressing the occurrence of flare due to the unnecessary-order diffracted light exited from the diffractive optical element, and it is also possible to provide a microscope system.

BRIEF DESCRIPTION OF DRAWINGS

FIG. 4 shows lens configuration diagrams showing a configuration of a microscope optical system according to a first example, wherein FIG. 4(a) shows the whole microscope optical system, FIG. 4(b) shows an objective lens, and FIG. 4(c) shows a second objective lens and a prism.

FIG. 5 snows spot diagrams of the microscope optical system according to the first example, wherein FIG. 5(a) shows the zero-order diffracted light and FIG. 5(b) shows the second-order diffracted light.

FIG. 6 shows lens configuration diagrams showing a configuration of a microscope optical system according to a second example, wherein FIG. 6(a) shows the whole microscope optical system, FIG. 6(b) shows an objective lens, and FIG. 6(c) shows a second objective lens and a prism.

FIG. 7 shows spot diagrams of the microscope optical system according to the second example, wherein

FIG. 8 shows lens configuration diagrams showing a configuration of a microscope optical system according to a third example, wherein FIG. 8(a) shows the whole microscope optical system, FIG. 8(b) shows an objective lens, and FIG. 8(c) shows a second objective lens and a prism.

FIG. 9 shows spot, diagrams of the microscope optical system according to the third example, wherein

FIG. 10 shows lens configuration diagrams showing a configuration of a microscope optical system according to a fourth example, wherein FIG. 10(a) shows the whole microscope optical system, FIG. 10(b) shows an objective lens, and FIG. 10(c) shows a second objective lens and a prism.

FIG. 11 shows spot diagrams of the microscope optical system according to the fourth example, wherein FIG. 11(a) shows the zero-order diffracted light and FIG. 11(b) shows the second-order diffracted light.

FIG. 12 shows lens configuration diagrams showing a configuration of a microscope optical system according to a fifth example, wherein FIG. 12(a) shows the whole microscope optical system, FIG. 12(b) shows an objective lens, and FIG. 12(c) shows a second objective lens and a prism.

FIG. 13 shows spot diagrams of the microscope optical system according to the fifth example, wherein

FIG. 14 shows lens configuration diagrams showing a configuration of a microscope optical system according to a sixth example, wherein FIG. 14(a) shows the whole microscope optical system, FIG. 14(b) shows an objective lens, and FIG. 14(c) shows a second objective lens and a prism.

FIG. 15 shows spot diagrams of the microscope optical system according to the sixth example, wherein

DESCRIPTION OF EMBODIMENT

Figure 1:
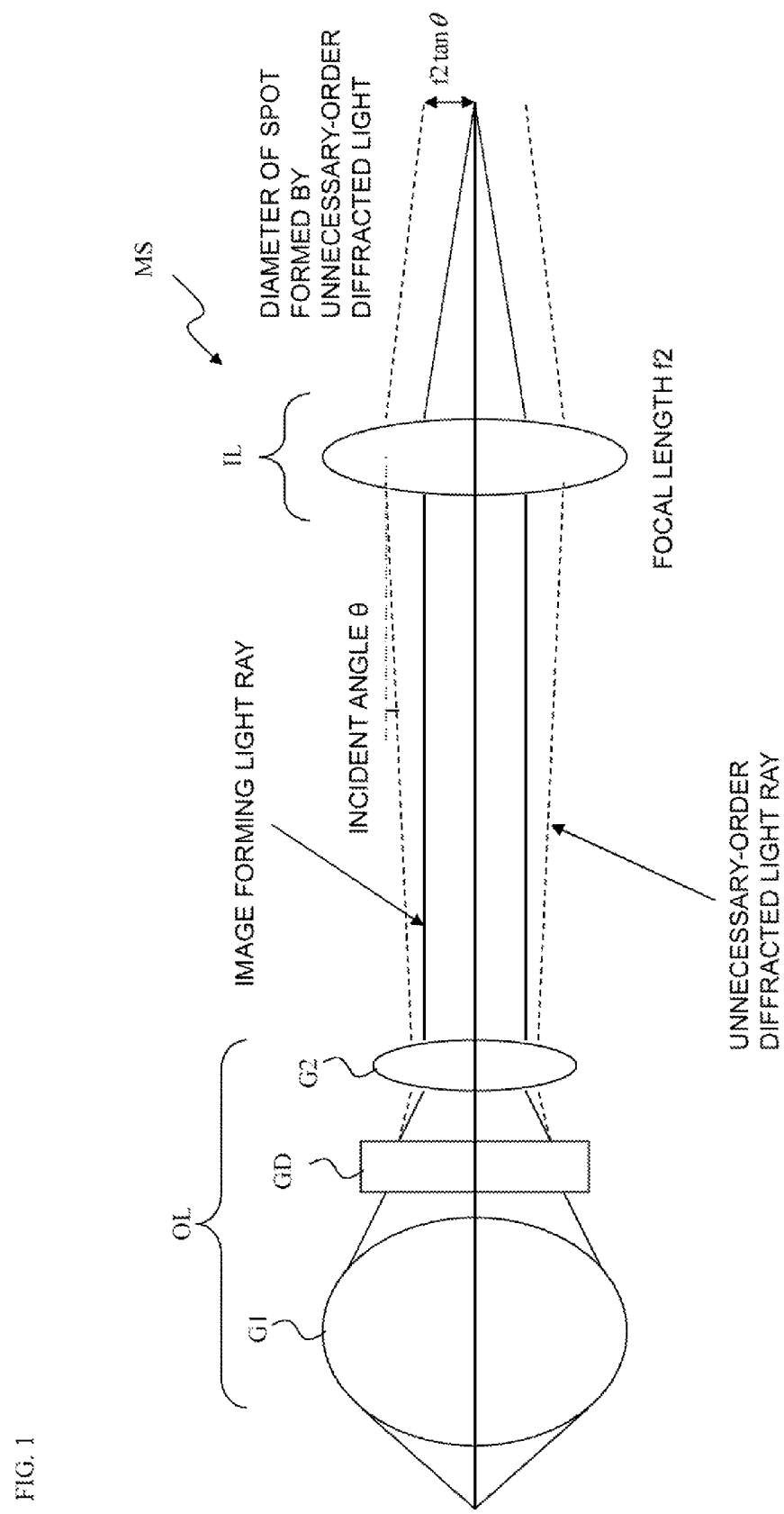
FIG. 1 is a view for explaining a configuration of a microscope optical system.

A microscope optical system has a problem that, when dark-field illumination is used, flare tends to become conspicuous. On the other hand, since the microscope optical system is an optical system also including an illumination system, very bright light, sources are provided in the inside and the outside of the visual field and do not become a source of flare. However, when a diffractive optical element is used in the microscope optical system, the unnecessary-order diffracted light-exited from the diffractive optical element becomes a problem in addition to the conventional problem of flare caused by multiple reflections. The light quantity of the flare due to the unnecessary-order diffracted light is determined by the diffraction efficiency for the order of the unnecessary-order diffracted light, and the illuminance of the flare is determined by the size of the spot which is formed on the image forming surface. Therefore, in a microscope optical system using a diffractive optical element, it is necessary that the diffraction efficiency of the order of diffracted light contributing to the image formation is enhanced and that the size of the spot of the flare caused by the unnecessary-order diffracted light is increased.

Generally, in a microscope optical system, a light flux from an object is converted into a substantially parallel light flux by an infinity-system objective lens, and the substantially parallel light flux is formed into an image by a second objective lens. The microscope optical system is configured so as to enable switching between image acquisition and visual observation in such a manner that, when a CCD camera is arranged at the image forming position of the second objective lens, the image can be acquired, and that, when an eyepiece is arranged at the image forming position of the second objective lens, the image can be visually observed. In such a microscope optical system, it is more suitable for observation of a dark object to use a CCD camera in which the imaging time can be adjusted to be long. On the other hand, flare is easily caused by the use of such CCD camera. Note that the microscope optical system is a magnifying system, and hence the height of the object is small. Therefore, even when the heights of the objects are different from each other, the difference in the optical path in the objective lens between the objects is small. For this reason, in the case where the flare caused by the diffractive optical element is considered, there is no problem even when only the light emitted from the object located on the optical axis is considered.

In the following, a preferred embodiment according to the present invention will be described with reference to the accompanying drawings. First, a description is given on the basis of a microscope optical system MS shown in FIG. 1. The microscope optical system MS is configured by including an objective lens OL which converts light from an object into a substantially parallel light flux by condensing the light from the object, and a second objective lens IL which forms an image of the object by focusing the substantially parallel light flux. Further, in the objective lens OL by which the light from the object is condensed and converted into a converging light flux, and by which the converging light flux is converted into the substantially parallel light flux, a diffractive optical element GD is arranged at a position through which the converging light flux converted from the light from the object passes. For this reason, in the following description, a lens group which is configured by lenses provided on the object side from the diffractive optical element GD is referred to as a first lens group G1, and a lens group which is configured by lenses provided on the image side from the diffractive optical element GD is referred to as a second lens group G2.

The diffractive optical element GD (diffractive optical surface) has a negative dispersion value (Abbe number=−3.453 in the example described below). Dispersion is large, and anomalous dispersibility (partial dispersion ratio (ng−nF)/(nF−nC)=0.2956 in the example described below). Therefore, the diffractive optical element GD has powerful chromatic aberration correction capability. Although the Abbe number of an optical glass is usually about 30 to 80, the Abbe number of the diffractive optical element is a negative value as described above. In other words, the diffractive optical surface of the diffractive optical element GD has dispersion characteristics opposite of those of the normal glass (refractive optical element). A refractive index decreases with a decrease in the wavelength of the light, and light with a longer wavelength is bent more. Therefore, a large achromatic effect can be attained by a combination with the normal refractive optical element. As a result, the use of the diffractive optical element GD allows favorable correction of chromatic aberration that cannot be attained by the normal optical glass.

As shown in FIG. 1, it is seen that, in order to increase the size of the spot formed on the image forming surface by the unnecessary-order diffracted light generated by the diffractive optical element GD, it is only necessary to increase the incident angle θ of the light incident on the second objective lens IL. The optical system between the objective lens OL and the second objective lens IL is substantially a parallel optical system. Therefore, in the case of the light emitted from the object on the optical axis, the incident angle of the light with respect to the second objective lens IL is about 0°. Further, since, as the image side numerical aperture (NA) of the microscope optical system MS is increased, a brighter image is formed, and hence the flare is made less conspicuous.

In the microscope optical system MS shown in FIG. 1, when, among a plurality of orders of diffracted light exited from the diffractive optical element as a result of diffraction of the maximum NA ray which is emitted from the object located on the optical axis and which is made incident on the diffractive optical element GD, the incident angle of the unnecessary-order diffracted light, with respect to the second objective lens IL, is set as θ, and when the focal length of the second objective lens IL is set as f2, the height of the spot from the optical axis, which spot is formed on the image surface by the unnecessary-order diffracted light, is expressed as f2 tan θ. From the results of experiment by the present inventors, it has been seen that, in the case where light from an object, is condensed by an optical system having the object side NA of 0.015 and having resolution usually required for a microscope, the flare is made inconspicuous at the time when the radius of the spot formed on the image surface by the unnecessary-order diffracted light is increased to about 2.0 mm. Therefore, if is seen that, in order to make the flare inconspicuous, the incident angle θ of the unnecessary-order diffracted light, which is exited from the diffractive optical element as a result of diffraction of the maximum NA ray and which is made incident on the second objective lend IL, needs only to satisfy the following expression (a).

[Expression 3]

$$|\theta| > \tan^{-1}(2.0 \times 0.015/(f2 \times NA))$$ (a)

Here, the MA in expression (a) is the image side NA.

Further, when expression (a) is expressed by the diameter D [mm] (D=2×f2×NA) of the entrance pupil to the second objective lens IL, the following expression (1) is obtained.

That is, when the unnecessary-order diffracted light is made incident on the second objective lens IL at the incident angle θ expressed by conditional expression (1), and when NA=0.015, the radius of the spot formed by the unnecessary-order diffracted light becomes 2.0 mm or more, so that the flare can be made inconspicuous. Note that the unnecessary-order diffracted light means the light included in the diffracted, light exited from the diffractive optical, element GD, and having an order of diffraction different, from the order used for the image formation of the object by the microscope optical system MS. For this reason, when it is assumed that the diffracted light used for the image formation is the m-th order diffracted light, the unnecessary-order diffracted light can be expressed as the (m−1)th order diffracted light and the (m+1)th order diffracted light. Further, since each of the (m−2)th order diffracted light and the (m+2)th order diffracted light has a larger difference in the diffraction order from the m-th order diffracted light, as compared with each of the (m−1)th order diffracted light and the (m+1)th order diffracted light, the optical path of each of the (m−2)th order diffracted light and the (m+2)th order diffracted light is more deviated from the optical path of the m-th order diffracted light as compared with the optical path of each of the (m−1)th order diffracted light and the (m+1)th order diffracted light. Therefore, the diameter of the spot formed by each of the (m−2)th order light and the (m+2) oh order light becomes larger than the diameter of the spot formed by each of the (m−1)th order light and the (m+1)th order light. For this reason, in the present invention, the (m−1)th order diffracted light and the (m+1)th order diffracted light, each of which is the diffracted light closest to the m-th order diffracted light, are described. It is obvious that the size of the spot formed by the diffracted light, which has a larger difference in the diffraction order from the m-th order diffracted light as compared with the (m−1)th order diffracted light and the (m+1)th order diffracted light, becomes larger than the size of the spot formed by each of the (m−1)th order diffracted light and the (m+1)th order diffracted light. Therefore, the detailed description thereof is omitted.

[Expression 4]

$$|\theta| > \tan^{-1}(0.06/D)$$ (1)

Figure 2:
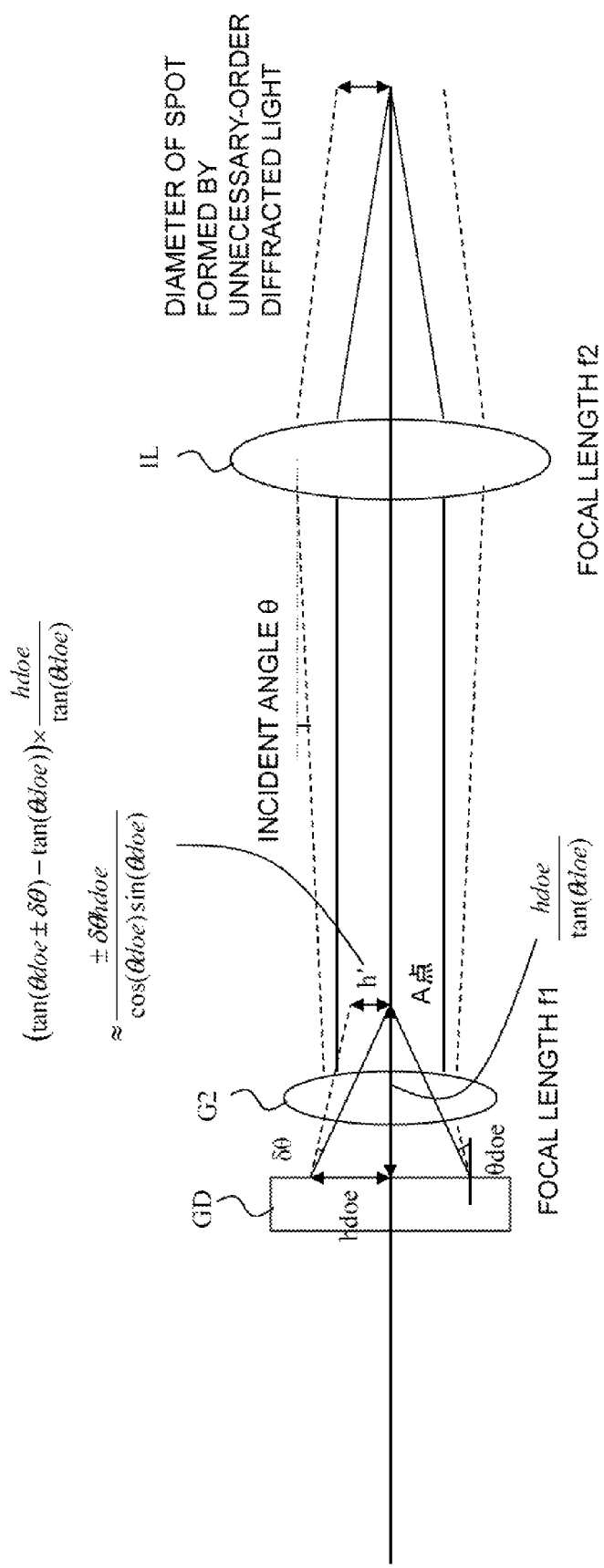
FIG. 2 is a view for explaining a relationship among a diffractive optical element and a second lens group which configure an objective lens, and a second objective lens.

As shown in FIG. 2, when the focal length of the lens group (second lens group G2) configured by lenses arranged on the image side from the diffractive optical element GD is set as f1, and further, among diffracted light exited from the diffractive optical element GD as a result of diffraction of the maximum NA ray which is emitted from the object located on the optical axis and which is made incident on the diffractive optical element GD, the output angle of the diffracted light having the diffraction order used for the image formation is set as θdoe, and when the height at which the maximum MA ray is exited from the diffractive optical element GD is set as hdoe, the focal point of the light flux exited from the diffractive optical element GD is located at the point (denoted by A shown in FIG. 2) which is away from the diffractive optical element GD by the distance expressed by hdoe/tan (θdoe). Also, the optical system between the objective lens OL and the second objective lens IL is configured as a parallel optical system, and hence the point A becomes the focus position of the second lens group G2.

In the microscope optical system MS, the lens group (second lens group G2) provided on the image side from the diffractive optical element GD has negative refractive power in many cases. In this case, the point A becomes a virtual image position for the lens group (second lens group G2)

having the focal length f1. At this time, the height h' of the unnecessary-order diffracted light (having an angle δθ with respect to the image forming ray as shown in FIG. 2) at the point A is expressed by the following expression (b).

[Expression 5]

$$h' = (\tan(\theta doe \pm \delta\theta) - \tan(\theta doe)) \times \frac{hdoe}{\tan(\theta doe)} \quad (b)$$

$$\approx \frac{\pm \delta\theta hdoe}{\cos(\theta doe)\sin(\theta doe)}$$

Further, the output angle of the unnecessary-order diffracted light exited from the lens group (second lens group G2) which is included in the lens group configuring the objective lens OL and which is configured by the lenses arranged on the image side from the diffractive optical element GD, that is, the incident angle θ of the unnecessary-order diffracted light with respect to the second objective lens IL is expressed by the following expression (c).

[Expression 6]

$$\theta = \tan^{-1}\left(\frac{\pm \delta\theta}{\cos(\theta doe)\sin(\theta doe)} \frac{hdoe}{f1}\right) \quad (c)$$

From the above, when θ expressed by expression (c) is substituted in expression (1), expression (2) is obtained. Therefore, it is seen that expression (2) needs only to be satisfied in order that the radius of the spot formed on the image surface by the unnecessary-order diffracted light is increased to about 2 mm in the microscope optical system 1 having the image side NA of 0.015.

[Expression 7]

$$|\delta\theta| > \left|\frac{0.06}{hdoe}\frac{f1}{D}\cos(\theta doe)\sin(\theta doe)\right| \quad (2)$$

However, the image formed by the second lens group G2 is not subjected to aberration correction at all. For this reason, a deviation is caused between the trace obtained by expressions (b) and (c) derived from the paraxial expressions, and the actual ray tracing result. The incident angle of the light incident on the second objective lens IL generally tends to become larger than the angle obtained by expression (c), and hence the consistency between expression (1) and expression (2) is improved when the value obtained by expression (2) is corrected by about 10%. Therefore, it is more desirable that expression (2) is corrected as in the following expression (2').

[Expression 8]

$$|\delta\theta| > \left|\frac{0.054}{hdoe}\frac{f1}{D}\cos(\theta doe)\sin(\theta doe)\right| \quad (2')$$

Note that, when a light flux from a point on the object side is focused at one point on the image forming surface, the light quantity per unit area on the image forming surface at this time is inversely proportional to the spot area. Therefore, the brightness by diffracted light having a diffraction order different from the diffraction order of the m-th diffracted light is inversely proportional to the area of the spot on the image forming surface. That is, the brightness by diffracted light having a diffraction order different from the diffraction order of the m-th diffracted light is reduced, in inverse proportion to the square of the diameter of the spot formed on the image forming surface. Therefore, the brightness of the flare light itself generated by the diffractive optical element GD is reduced on the image forming surface.

In the configuration in which the diffractive optical element GD is arranged at a position in the objective lens OL, which position is close to the object, the diffractive optical element GD is arranged at the place where the light, flux passing through the objective lens OL is spread. Therefore, the incident angle of the light flux incident on the diffractive optical element GD is easily increased, and hence this configuration is disadvantageous in terms of the diffraction efficiency. Further, in the configuration in which the diffractive optical element GD is arranged at a position which is located in the middle of the objective lens OL and in which the light, flux is a substantially parallel light, flux, the diameter of the light flux is large, and hence this configuration is not desirable because high order aberrations are easily generated. For these reasons, as described above, it is desirable that, the objective lens OL is configured such that the lens group (second lens group G2) arranged on the image side from the diffractive optical element GD has negative refractive power, and such that, the diffractive optical element GD is arranged at a position, which is located on the object side from the second lens group G2 and at which the light flux passing through the objective lens OL is converged.

In such microscope optical system MS, the total light quantity of the flare is determined by the diffraction efficiency of the diffractive optical element GD, and hence it is important to increase the diffraction efficiency. Three causes of deterioration of the diffraction efficiency of the diffractive optical element GD are listed as follows. That is, the first cause is that the wavelength of light passing through the diffractive optical surface of the diffractive optical element GD is different from the blaze wavelength. The second cause is that, the incident angle of light incident on the diffractive optical surface of the diffractive optical element GD is different from the blaze condition. The third cause is that the shape of the diffractive optical surface of the diffractive optical element GD is deviated from the blaze shape. The third cause is a problem of the shape error in manufacturing the diffractive optical surface, while the first and second causes are problems which are inevitably caused when a certain wavelength range and a certain range of visual field are secured. In this case, the above-described problems can foe solved by use of a contact multi-layered diffractive optical element for the diffractive optical element GD.

The contact multi-layered diffractive optical element is configured by using two different optical materials which substantially satisfy the following expression (d), and the diffractive optical surface of the diffractive optical element is formed by providing a diffraction grating pattern on the bonded surface of the two optical materials. Rote that in expression (d), the refractive indexes of one of two optical materials with respect to the d-line, F-line, and C-line are respectively set as $n_{1d}$, $n_{1F}$ and $n_{1C}$, and the refractive indexes of the other of two optical materials with respect to the d-line, F-line, and C-line are respectively set as $n_{2d}$, $n_{2F}$ and $n_{2C}$.

[Expression 9]

$$\frac{\Delta n_d}{\Delta(n_F - n_C)} = \frac{\lambda_d}{\lambda_F - \lambda_C} \quad (d)$$

where $\Delta n_d = n_{1d} - n_{2d}$ $\Delta(n_F - n_C) = (n_{1F} - n_{1C}) - (n_{2F} - n_{2C})$ The contact multi-layered diffractive optical element can have high diffraction efficiency in a wide wavelength range ranging from the g-line to C-line. Therefore, the objective lens OL used in the microscope optical system MS according to the present embodiment can be used in the wide wavelength range. Mote that, when first-order diffracted light is used in a transmission type diffractive optical element, the diffraction efficiency is expressed by a ratio θ between the intensity I0 of the incident light and the intensity I1 of the first order diffracted light (=I1/I0×100[%]). Further, the contact multi-layered diffractive optical element can be manufactured by a simpler process as compared with a so-called separate multi-layered diffractive optical element which is formed in such a manner that two diffractive elements, each having a diffraction grating pattern formed thereon, are arranged close to each other so that the diffraction grating patterns face each other. For this reason, the contact multi-layered diffractive optical element has advantages that mass production efficiency is good and that, the diffraction efficiency with respect to the incident angle of a ray is good. Therefore, the objective lens OL according to the present embodiment, in which the contact multi-layered diffractive optical element GD is used, can be easily manufactured and also has good diffraction efficiency.

Further, the diffraction grating pattern of the contact multi-layered diffractive optical element GD is formed on the bonded surface of the diffractive elements, each of which is arranged on a planar substrate. When the diffractive element is arranged on the planar substrate, and when the diffraction grating pattern is formed in this way, the diffraction grating pattern can be formed more easily as compared with the case where the diffraction grating pattern is formed on the spherical surface, and the like. Therefore, an accurate diffraction grating pattern can be easily obtained.

Figure 3:
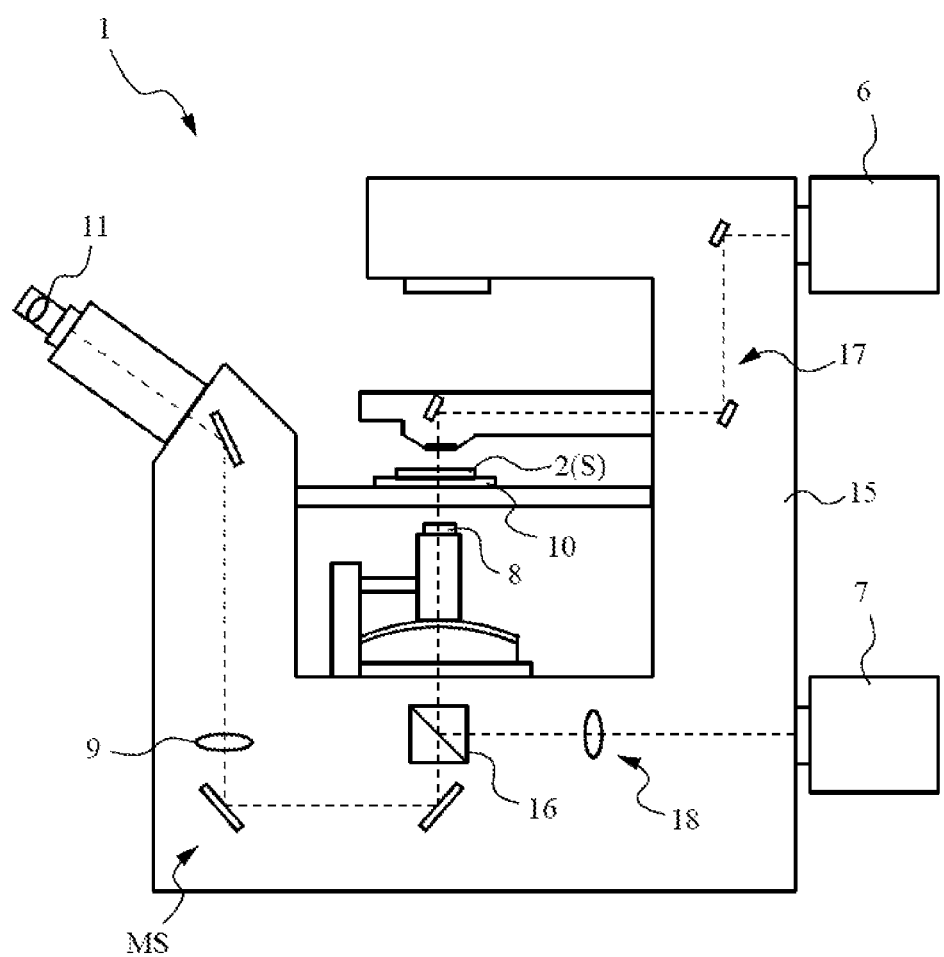
FIG. 3 is a view for explaining a configuration of a microscope system.

The microscope optical system MS according to the present embodiment as described above is used in a microscope system 1 as shown in FIG. 3. In FIG. 3, the microscope system 1 is used to observe a preparation 2 on which a specimen S is placed, and the microscope system 1 includes a microscope optical system MS configured by a first light source apparatus 6, a second light source apparatus 7, an objective lens 8 (OL), and a second objective lens 9 (IL), an eyepiece optical system 11 which guides, to the eyeballs of a user, the light-flux from the image formed by the microscope optical system MS, and a stage 10 which can be moved while supporting the preparation 2. The focusing operation can be performed by moving the stage 10 in the optical axis direction of the objective lens 8. Of course, it may also be configured such that a focus detection mechanism is separately provided, and such that the amount, of movement of the stage 10 is controlled on the basis of the output from the focus detection mechanism. Further, the microscope system 1 includes a body 15, so that the first light source apparatus 6, the second light source apparatus 7, the objective lens 8, the second objective lens 9, and the stage 10 are supported by the body 15.

Note that the microscope system 1 includes a first illumination optical system (transmitted illumination optical system) 17 which illuminates the preparation 2 by using the light emitted from the first light source apparatus 6, and a second illumination optical system (vertical illumination optical system) 18 which illuminates the preparation 2 by using the light emitted from the second light source apparatus 7. Here, the objective lens 8 is also included in a part of the second illumination optical system 18, and the light emitted from the second light source apparatus 7 is guided to the objective lens 8 by an optical path combining member 16. As the optical path combining member 16, a mirror whose portion near and including the optical axis of the objective lens 8 is transparent, and whose peripheral portion has a reflection film formed thereon may be adopted, or a half mirror may also be adopted. In the former case, it is possible to perform dark field observation. In the latter case, it is possible to perform bright field observation by vertical illumination.

Further, imaging means may be mounted, at the position at which an image is formed by the objective lens 8 and the second objective lens 9. Of course, it may also be configured such that, the light flux from the objective lens 8 is divided by optical path dividing means (not shown) and the second objective lens is separately provided such that imaging means is provided at the position at which an image is formed by the second objective lens. Further, the microscope system 1 may be either an upright microscope or an inverted microscope. Further, only one of the first, light, source apparatus 6 and the second light source apparatus 7 may be used.

EXAMPLES

In the following, six examples of the microscope optical system MS according to the present, embodiment are described, and in each of the examples, the phase difference of the diffractive optical surface formed in the diffractive optical element GD is calculated by an ultra-high index method which is performed by using the usual refractive index and aspheric surface expression (d) described below. The ultra-high index method is a method using a predetermined equivalence relationship between the aspheric shape and the grating pitch of the diffractive optical surface, and in the present, examples, the diffractive optical surface is represented as data of the ultra-high index method, that is, represented by aspheric surface expression (d) described below and the coefficients of the expression. Note that, in the present examples, the d-line, C-line, F-line, and q-line are selected as targets of calculation of aberration characteristics. The following Table 1 shows the wavelengths of the d-line, C-line, F-line, and g-line used in the present examples, and also shows the values of refractive indexes which are set for the respective spectrum lines and which are used for the calculation based on the ultra-high index method.

TABLE 1

| Wavelength | | Refractive index (used in ultra-high index method) |
|---|---|---|
| d-line | 587.562 nm | 10001.0000 |
| C-line | 656.273 nm | 11170.4255 |
| F-line | 486.133 nm | 8274.7311 |
| g-line | 435.835 nm | 7418.6853 |

In each of the examples, the aspheric surface is expressed by the following expression (d) in which the height in the direction vertical to the optical axis is set as y; the distance (sag amount) from the tangent-plane of the vertex of each aspheric surface to the each aspheric surface along the optical axis at height y is set as S (y); the radius of curvature of the reference spherical surface (apical radius) is set as r; the constant is set as κ; and the n-th aspheric surface coefficient, is set as An. Mote that, in the following examples, "E−n" represents "×10$^{-n}$".

$$S(y)=(y^2/r)/\{1+(1-\kappa \times y^2/r^2)^{1/2}\}+A2 \times y^2+A4 \times y^4+A6 \times y^6+A8 \times y^8 \quad (d)$$

Note that, in each of the examples, a symbol "*" is attached to the right side of the surface number included in the table and corresponding to the lens surface on which the diffractive optical surface is formed, and aspheric surface expression (d) represents the specifications related to the performance of the diffractive optical surface.

First Example

First, a microscope optical system MS1 shown in FIG. 4 as a first example is described. The microscope optical system MS1 is configured by, in order from the object side, an objective lens OL, a second objective lens IL, and a prism PR. Further, the objective lens OL is configured by, in order from the object side, a first lens group G1, a diffractive optical element GD, and a second lens group G2. Further, the first lens group G1 is configured by, in order from the object side, a positive meniscus lens L1 whose concave surface is directed to the object, side, a positive meniscus lens L2 whose concave surface is directed to the object side, a cemented lens formed by bonding together a negative meniscus lens L3 whose convex surface is directed to the object, side, and a biconvex lens L4, and a cemented lens formed by bonding together a biconvex lens L5, a biconcave lens L6, and a biconvex lens L7. Further, in the diffractive optical element. GD, a plate-shaped optical glass L8, two optical members L9 and L10 which are respectively formed of different, resin materials, and a plate-shaped optical glass L11 are bonded together in this order from the object side, and a diffraction grating pattern (diffractive optical surface) is formed on the bonded surface of the optical members L9 and L10. That, is, the diffractive optical element GD is a contact multi-layered diffractive optical element. Further, the second lens group G2 is configured by a cemented lens formed by bonding, in order from the object side, a biconcave lens L12, a biconvex lens L13, and a biconcave lens L14 to each other. Further, the second objective lens IL is configured by, in order from the object, side, a cemented lens formed by bonding together a biconvex lens L15 and a negative meniscus lens L16 whose concave surface is directed to the object side, and a cemented lens formed by bonding together a biconvex lens L17 and a biconcave lens L18. Note that both ends of the prism PR are configured by planar optical glass. Further, the prism PR is illustrated only in consideration of the optical path length, and hence the actual shape of the prism PR is not illustrated in FIG. 4 (as well as in each of the examples described below).

Table 2 shows specifications of the microscope optical system MS1 according to the first example shown in FIG. 4.

Note that, in Table 2, f represents the focal length of the whole system of the objective lens OL; f1 represents the focal length of the second lens group G2 configuring the objective lens OL; f2 represents the focal length of the whole system of the second objective lens XL; β represents the magnification; NA represents each of the object-side and image-side numerical apertures of the optical system formed by combining the objective lens OL with the second objective lens XL; d0 represents the distance on the optical axis from the object surface to the vertex of the object side lens surface (first surface) of the first lens (positive meniscus lens L1); D represents the diameter of the entrance pupil to the second objective lens IL; hdoe represents the height at which the maximum NA ray from the object on the optical axis is exited from the diffractive optical element GD; and θdoe represents the angle at which the maximum NA ray from the object on the optical axis is exited from the diffractive optical element GD (and is set as the angle at which the first-order diffracted light contributing the image formation is exited). Further, in Table 2, the first column m represents the number of each of the optical surfaces from the object side; the second column r represents the radius of curvature of each of the optical surfaces; the third column d represents the distance (distance between surfaces) on the optical axis from each of the optical surfaces to the next optical surface; the fourth column nd represents the refractive index relative to the d-line, and the fifth column vd represents the Abbe number relative to the d-line. Here, the number of each of the optical surfaces shown in the first column m (the symbol * attached to the right side of the number represents the lens surface formed as the diffractive optical surface) corresponds to each of the surface numbers 1 to 29 shown in FIG. 4. Further, in the second column r, the radius of curvature 0.000 represents a plane. Further, as for the diffractive optical surface, the radius of curvature of the spherical surface, which is used as the reference of the aspheric surface serving as the base of the calculation, is shown in the second column r, and the data used for the ultra-high index method are shown as aspheric surface data in the table of specifications. Here, the refractive index 1.000 of air is omitted in the fourth column nd. Further, the fifth column vd represents the value of vd= (nd−1)/(nF−nC) where the refractive index relative to the F-line is set as nF and the refractive index relative to the C-line is set as nC. Further, Table 2 shows values corresponding to the above-described conditional expressions (1) and (2), that is, values corresponding to the conditions. The above description of the specification table is the same as that in the following examples.

Note that the radius of curvature r, the distance d between the surfaces, the focal length f of the objective lens, and other lengths, which are described in all the following specifications, are generally expressed by the unit of "mm" unless other-wise specified. Since the equivalent optical performance is obtained even when the optical system is proportionally enlarged or proportionally reduced, the unit is not limited to "mm", and any other suitable unit can also be used.

TABLE 2 f = 4
f1 = −22.4
f2 = 200
β = 50×
NA (Object side) = 0.8
NA (Image side) = 0.016
d0 = 3.38
D = 6.4

TABLE 2-continued hdoe = 6.1
θdoe = 8.0 [°]

| m | r | d | nd | νd |
|---|---|---|---|---|
| 1 | −4.220 | 4.00 | 1.903 | 35.7 |
| 2 | −5.421 | 0.20 | | |
| 3 | −47.354 | 4.00 | 1.603 | 65.5 |
| 4 | −12.900 | 0.20 | | |
| 5 | 85.133 | 1.10 | 1.517 | 52.4 |
| 6 | 12.610 | 8.00 | 1.498 | 82.5 |
| 7 | −16.869 | 0.20 | | |
| 8 | 30.992 | 5.35 | 1.640 | 60.1 |
| 9 | −17.900 | 1.20 | 1.738 | 32.3 |
| 10 | 9.973 | 5.60 | 1.498 | 82.5 |
| 11 | −32.895 | 3.00 | | |
| 12 | 0.000 | 2.50 | 1.517 | 64.1 |
| 13 | 0.000 | 0.06 | 1.528 | 34.7 |
| 14 | 0.000 | 0.00 | 10001.000 | −3.5 |
| 15* | 0.000 | 0.06 | 1.557 | 50.2 |
| 16 | 0.000 | 3.00 | 1.517 | 64.1 |
| 17 | 0.000 | 16.10 | | |
| 18 | −67.221 | 1.70 | 1.652 | 58.5 |
| 19 | 12.651 | 2.70 | 1.717 | 29.5 |
| 20 | −9.076 | 1.25 | 1.517 | 52.3 |
| 21 | 8.270 | 91.00 | | |
| 22 | 75.043 | 5.10 | 1.623 | 57.0 |
| 23 | −75.043 | 2.00 | 1.750 | 35.2 |
| 24 | 1600.580 | 7.50 | | |
| 25 | 50.256 | 5.10 | 1.668 | 42.0 |
| 26 | −84.541 | 1.80 | 1.613 | 44.4 |
| 27 | 36.911 | 5.50 | | |
| 28 | 0.000 | 30.00 | 1.569 | 56.0 |
| 29 | 0.000 | 143.81 | | |

Diffractive optical surface data

Fifteenth surface κ = 1   A2 = −5.9524E−08   A4 = 3.8419E−10
                          A6 = −4.8802E−12   A8 = 6.5871E−15

Values corresponding to conditions (1) Left side
       |θ| (Zero order) = 0.74 [°]
       |θ| (Second order) = 0.72 [°]
    Right side = 0.54 [°]
(2) Left side
       |δθ| (Zero order-First order) = 0.37 [°]
       |δθ| (Second order-First order) = 0.37 [°]
    Right side = 0.27 [°]
(2') Right side = 0.25 [°]

Note that, the values corresponding to the conditions and shown in Table 2 are obtained by using the first-order diffracted light, as image forming light, and by assuming each of the zero-order diffracted light and the second-order diffracted light as the unnecessary-order diffracted light. In this way, it is seen that both the conditional expressions (1) and (2) are satisfied in the first example. Further, the first-order diffracted light is also used as image forming light similarly in the following examples.

FIG. 5 shows spot diagrams of spots formed by the zero-order diffracted light and the second-order diffracted light (unnecessary-order diffracted light) in the first example. Note that, in the spot diagrams shown in FIG. 5, B represents the height, of the object (similarly, B represents the height, of the object in the following examples). As shown in FIG. 5, each of the spots formed by the zero-order diffracted light, and the second-order diffracted light, each of which is unnecessary-order diffracted light, has a height, of 1.9 mm or more from the optical axis of the spot. Therefore, in the microscope optical system MS1 according to the first example, the flare formed on the image surface by the zero-order diffracted light and the second-order diffracted light can be made inconspicuous.

Second Example

Next, a microscope optical system MS2 shown in FIG. 6 is described as a second example. The microscope optical system MS2 is also configured by, in order from the object, side, an objective lens OL, a second objective lens IL, and a prism PR. Further, the objective lens OL is configured by, in order from the object, side, a first, lens group G1, a diffractive optical element GD, and a second lens group G2. Further, the first lens group G1 is configured by, in order from the object, side, a positive meniscus lens L1 whose concave surface is directed to the object, side, a positive meniscus lens L2 whose concave surface is directed to the object, side, a cemented lens formed by bonding together a biconvex lens L3 and a negative meniscus lens L4 whose concave surface is directed to the object, side, a cemented lens formed by bonding together a biconvex lens L5, a biconcave lens L6, and a biconvex lens L7, and a cemented lens formed by bonding together a biconvex lens L8 and a negative meniscus lens L9 whose concave surface is directed to the object side. Further, in the diffractive optical element GD, a plate-shaped optical glass L10, two vex lens L8 and a negative meniscus lens L9 whose concave surface is directed to the object side. Further, in the diffractive optical element GD, a plate-shaped optical glass L10, two optical members L11 and L12 which are respectively formed of different resin materials, and a plate-shaped optical glass L13 are bonded together in this order from the object side, and a diffraction grating pattern (diffractive optical surface) is formed on the bonded surface of the optical members L11 and L12. That, is, the diffractive optical element GD is a contact multi-layered diffractive optical element. Further, the second lens group G2 is configured by, in order from the object, side, a biconcave lens L12, and a cemented lens formed by bonding together a biconcave lens L13 and a biconvex lens L14. Further, the second objective lens IL is configured by, in order from the object side, a cemented lens formed by bonding together a biconvex lens L15 and a biconcave lens L16, and a cemented lens formed by bonding together a biconvex lens L17 and a biconcave lens L18. Note that both ends of the prism PR are configured by planar optical glass.

Table 3 shows specifications of the microscope optical system MS2 according to the second example shown in FIG. 6. The surface numbers shown in Table 3 respectively correspond to the surface numbers 1 to 33 shown in FIG. 6.

TABLE 3

$f = 1.33$
$f1 = -4.83$
$f2 = 200$
$\beta = 150\times$
NA (Object side) = 0.9
NA (Image side) = 0.006
d0 = 2.95
D = 2.387
hdoe = 4.50
$\theta$doe = 15.60 [°]

| m | r | d | nd | νd |
|---|---|---|---|---|
| 1 | −5.290 | 3.50 | 1.804 | 39.6 |
| 2 | −5.030 | 0.15 | | |
| 3 | −18.200 | 2.90 | 1.603 | 65.5 |
| 4 | −9.566 | 0.15 | | |
| 5 | 27.978 | 6.20 | 1.498 | 82.6 |
| 6 | −12.264 | 1.30 | 1.569 | 56.0 |
| 7 | −19.297 | 0.20 | | |
| 8 | 30.758 | 5.60 | 1.498 | 82.6 |
| 9 | −13.300 | 1.00 | 1.673 | 38.2 |
| 10 | 12.192 | 6.70 | 1.498 | 82.6 |
| 11 | −14.331 | 0.15 | | |
| 12 | 21.570 | 4.70 | 1.498 | 82.6 |
| 13 | −10.130 | 1.00 | 1.804 | 39.6 |
| 14 | −89.173 | 0.70 | | |
| 15 | 0.000 | 2.50 | 1.517 | 64.1 |
| 16 | 0.000 | 0.06 | 1.528 | 34.7 |
| 17 | 0.000 | 0.00 | 10001.000 | −3.5 |
| 18* | 0.000 | 0.06 | 1.557 | 50.2 |
| 19 | 0.000 | 3.00 | 1.517 | 64.1 |
| 20 | 0.000 | 12.00 | | |
| 21 | −6.151 | 1.70 | 1.517 | 52.4 |
| 22 | 6.151 | 3.00 | | |
| 23 | −4.178 | 1.00 | 1.734 | 51.5 |
| 24 | 6.681 | 2.20 | 1.785 | 25.6 |
| 25 | −7.986 | 121.00 | | |
| 26 | 75.043 | 5.10 | 1.623 | 57.0 |
| 27 | −75.043 | 2.00 | 1.750 | 35.2 |
| 28 | 1600.580 | 7.50 | | |
| 29 | 50.256 | 5.10 | 1.668 | 42.0 |
| 30 | −84.541 | 1.80 | 1.613 | 44.4 |
| 31 | 36.911 | 5.50 | | |
| 32 | 0.000 | 30.00 | 1.569 | 56.0 |
| 33 | 0.000 | 143.78 | | |

Diffractive optical surface data

Eighteenth surface κ = 1   A2 = −7.3529E−08   A4 = 1.2704E−09
                           A6 = −3.6213E−11   A8 = 1.4394E−13

Values corresponding to conditions (1) Left side
     |θ| (Zero order) = 2.01 [°]
     |θ| (Second order) = 1.75 [°]
    Right side = 1.43 [°]
(2) Left side
     |δθ| (Zero order-First order) = 0.41 [°]
     |δθ| (Second order-First order) = 0.42 [°]
    Right side = 0.39 [°]
(2') Right side = 0.35 [°]

Figure 7B:
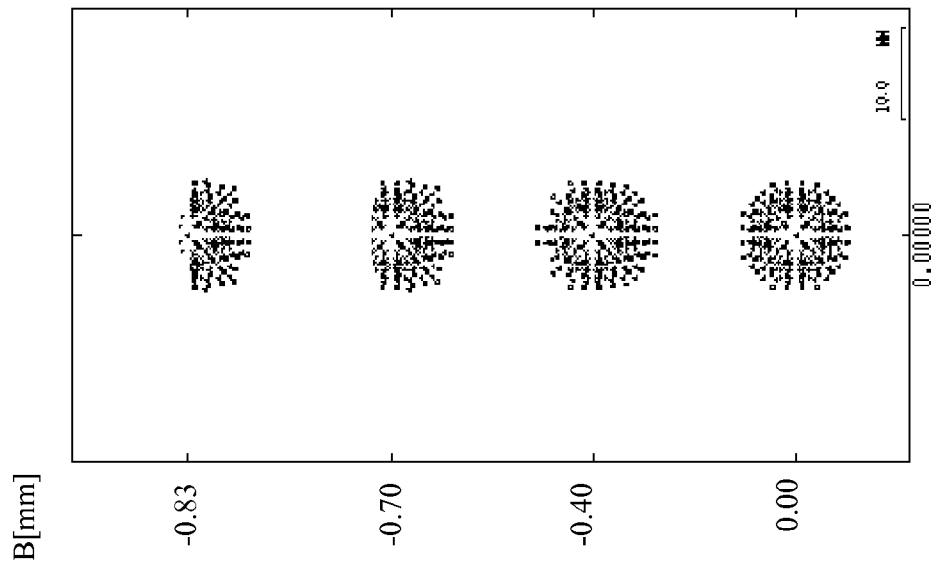
FIG. 7(a) shows the zero-order diffracted light and FIG. 7(b) shows the second-order diffracted light.
Figure 7A:
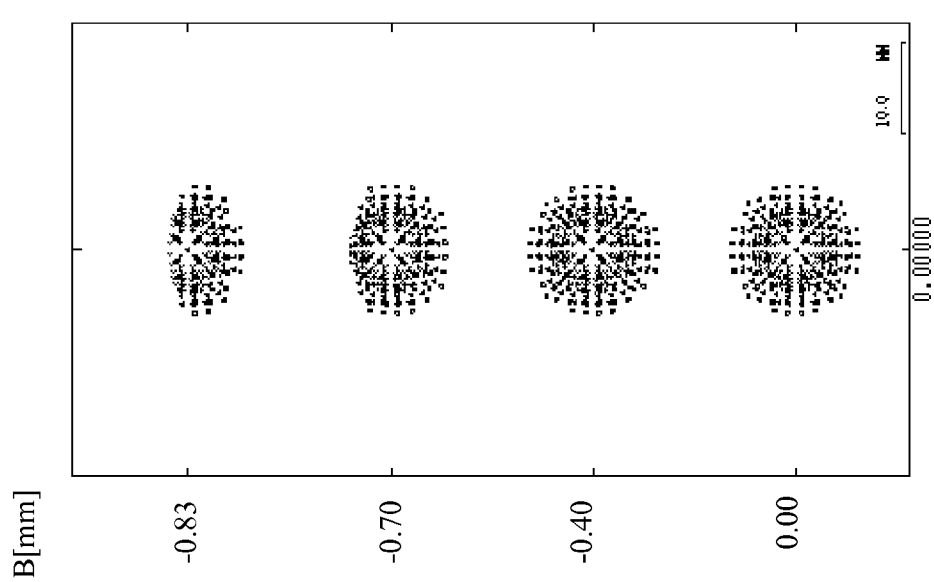

In this way, it is seen that both the conditional expressions (1) and (2) are satisfied in the second example. FIG. 7 shows spot diagrams of spots formed by the zero-order diffracted light and the second-order diffracted light in the second example. As shown in FIG. 7, each of the spots formed by the zero-order diffracted light and the second-order diffracted light, each of which is unnecessary-order diffracted light, has a height, of 5.0 mm or more from the optical axis of the spot. Therefore, in the microscope optical system M2 according to the second example, the flare formed on the image surface by the zero-order diffracted light and the second-order diffracted light can be made inconspicuous.

Third Example

Next, a microscope optical system MS3 shown in FIG. 8 is described as a third example. The microscope optical system MS 3 is also configured by, in order from the object side, an objective lens OL, a second objective lens IL, and a prism PR. Further, the objective lens OL is configured by, in order from the object, side, a first lens group G1, a diffractive optical element GD, and a second lens group G2. Further, the first, lens group G1 is configured by, in order from the object, side, a biconvex lens L1, a cemented lens formed by bonding together a biconvex lens L2 and a negative meniscus lens L3 whose concave surface is directed to the object, side, and a positive meniscus lens L4 whose convex surface is directed to the object, side. Further, in the diffractive optical element. GD, a plate-shaped optical glass L5, two optical members L6 and L7 which are respectively formed of different, resin materials, and a plate-shaped optical glass L8 are bonded together in this order from the object, side, and a diffraction grating pattern (diffractive optical surface) is formed on the bonded surface of the optical members L6 and L7. That is, the diffractive optical element GD is a contact multi-layered diffractive optical element. Further, the second lens group G2 is configured by, in order from the object side, a cemented lens formed by bonding together a positive meniscus lens L9 whose concave surface is directed to the object side, and a biconvex lens L10. Further, the second objective lens IL is configured by, in order from the object side, a cemented lens formed by bonding together a biconvex lens L11 and a biconcave lens L12, and a cemented lens formed by bonding together a biconvex lens L13 and a biconcave lens L14. Note that both ends of the prism PR are configured by planar optical glass.

Table 4 shows specifications of the microscope optical system MS3 according to the third example shown in FIG. 8. The surface numbers shown in table 4 respectively correspond to the surface numbers 1 to 24 shown in FIG. 8.

TABLE 4

$f = 20$
$f1 = -14.2$
$f2 = 200$
$\beta = 10\times$
NA (Object side) = 0.2
NA (Image side) = 0.02
$d0 = 38.00$
$D = 8$
$hdoe = 5.54$
$\theta doe = 17.15$ [°]

| m | r | d | nd | vd |
|---|---|---|---|---|
| 1 | 48.798 | 3.00 | 1.697 | 55.5 |
| 2 | −34.514 | 0.20 | | |
| 3 | 37.001 | 3.40 | 1.603 | 65.5 |
| 4 | −26.906 | 1.10 | 1.847 | 23.8 |
| 5 | −212.805 | 0.20 | | |
| 6 | 24.500 | 3.30 | 1.517 | 64.1 |
| 7 | 116.697 | 0.70 | | |
| 8 | 0.000 | 2.00 | 1.517 | 64.1 |
| 9 | 0.000 | 0.06 | 1.528 | 34.7 |
| 10 | 0.000 | 0.00 | 10001.000 | −3.5 |
| 11* | 0.000 | 0.06 | 1.557 | 50.2 |
| 12 | 0.000 | 3.00 | 1.517 | 64.1 |
| 13 | 0.000 | 3.50 | | |
| 14 | −23.277 | 3.50 | 1.805 | 25.4 |
| 15 | −11.689 | 1.50 | 1.620 | 60.3 |
| 16 | 12.655 | 136.60 | | |
| 17 | 75.043 | 5.10 | 1.623 | 57.0 |
| 18 | −75.043 | 2.00 | 1.750 | 35.2 |
| 19 | 1600.580 | 7.50 | | |
| 20 | 50.256 | 5.10 | 1.668 | 42.0 |
| 21 | −84.541 | 1.80 | 1.613 | 44.4 |
| 22 | 36.911 | 5.50 | | |
| 23 | 0.000 | 30.00 | 1.569 | 56.0 |
| 24 | 0.000 | 143.81 | | |

Diffractive optical surface data

Eleventh surface $\kappa = 1$   $A2 = -4.9388E-08$   $A4 = 3.0081E-12$
$A6 = -3.3504E-19$   $A8 = -1.6682E-15$ Values corresponding to conditions (1)   Left side
            $|\theta|$ (Zero order) = 0.56 [°]
            $|\theta|$ (Second order) = 0.56 [°]
      Right side = 0.43 [°]

TABLE 4-continued (2) Left side
|δθ| (Zero order-First order) = 0.36 [°]
|δθ| (Second order-First order) = 0.37 [°]
Right side = 0.31 [°]
(2') Right side = 0.28 [°]

Figure 9A:
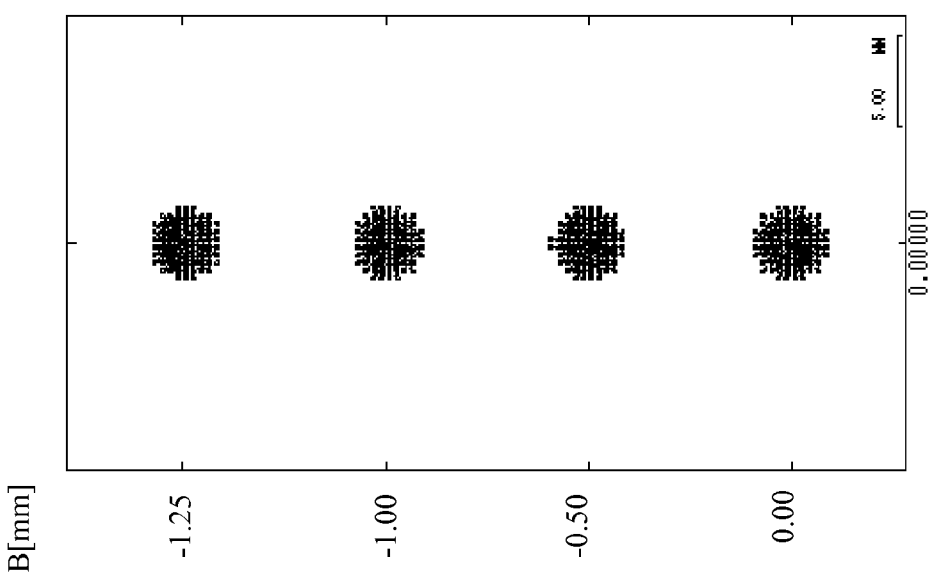
FIG. 9(a) shows the zero-order diffracted light and FIG. 9(b) shows the second-order diffracted light.
Figure 9B:
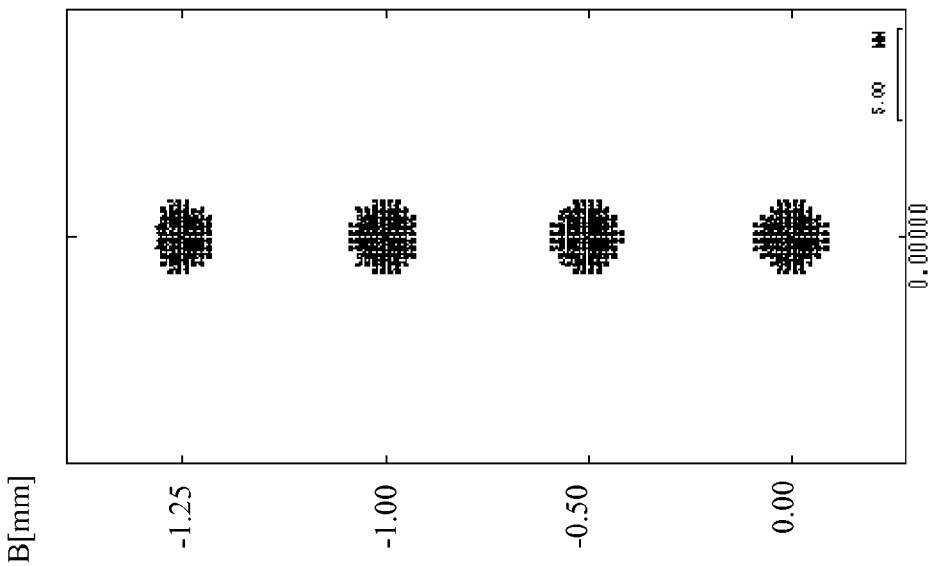

In this way, it is seen that both the conditional expressions (1) and (2) are satisfied in the third example. FIG. 9 shows spot diagrams of spots formed by the zero-order diffracted light and the second-order diffracted light (unnecessary-order diffracted light) in the third example. As shown in FIG. 9, each of the spots formed by the zero-order diffracted light and the second-order diffracted light, each of which is unnecessary-order diffracted light, has a height of 1.5 mm or more from the optical axis of the spot. Therefore, in the microscope optical system MS3 according to the third example, the flare formed on the image surface by the zero-order diffracted light and the second-order diffracted light can be made inconspicuous.

Fourth Example

Next, a microscope optical system MS4 shown in FIG. 10 is described as a fourth example. The microscope optical system MS4 is also configured by, in order from the object side, an objective lens OL, a second objective lens IL, and a prism PR. Further, the objective lens OL is configured by, in order from the object side, a first lens group G1, a diffractive optical element GD, and a second lens group G2. Further, the first lens group G1 is configured by, in order from the object side, a biconvex lens L1, a cemented lens formed by bonding together a negative meniscus lens L2 whose convex surface is directed to the object side, and a biconvex lens L3, and a cemented lens formed by bonding together a negative meniscus lens L4 whose convex surface is directed to the object side, and a positive meniscus lens L5 whose convex surface is directed to the object-side. Further, in the diffractive optical element GD, a plate-shaped optical glass L6, two optical members L7 and L8 which are respectively formed of different resin materials, and a plate-shaped optical glass L9 are bonded together in this order from the object, side, and a diffraction grating pattern (diffractive optical surface) is formed on the bonded surface of the optical members L7 and L8. That is, the diffractive optical element GD is a contact multi-layered diffractive optical element. Further, the second lens group G2 is configured by, in order from the object side, a cemented lens formed by bonding together a biconvex lens L10 and a biconcave lens L11, and a cemented lens formed by bonding together a positive meniscus lens L12 whose concave surface is directed to the object side, and a biconcave lens L13. Further, the second objective lens IL is configured by, in order from the object side, a cemented lens formed by bonding together a biconvex lens L14 and a biconcave lens L15, and a cemented lens formed by bonding together a biconvex lens L16 and a biconcave lens L17. Note that both ends of the prism PR are configured by planar optical glass.

Table 5 shows specifications of the microscope optical system MS4 according to the fourth example shown in FIG. 10. The surface numbers shown in Table 5 respectively correspond to the surface numbers 1 to 28 shown in FIG. 10.

TABLE 5 f = 10
f1 = −7.60
f2 = 200
β = 20×
NA (Object side ) = 0.3
NA (Image side) = 0.015
d0 = 30.60
D = 6
hdoe = 6.22
θdoe = 23.83 [°]

| m | r | d | nd | νd |
|---|---|---|---|---|
| 1 | 234.314 | 3.50 | 1.589 | 61.2 |
| 2 | −25.703 | 0.15 | | |
| 3 | 28.645 | 1.00 | 1.785 | 25.7 |
| 4 | 16.720 | 5.20 | 1.498 | 82.5 |
| 5 | −66.437 | 0.15 | | |
| 6 | 15.752 | 1.00 | 1.835 | 42.7 |
| 7 | 11.342 | 5.00 | 1.589 | 61.2 |
| 8 | 121.523 | 0.95 | | |
| 9 | 0.000 | 2.50 | 1.517 | 64.1 |
| 10 | 0.000 | 0.06 | 1.557 | 50.2 |
| 11 | 0.000 | 0.00 | 10001.000 | −3.5 |
| 12* | 0.000 | 0.06 | 1.528 | 34.7 |
| 13 | 0.000 | 3.00 | 1.517 | 64.1 |
| 14 | 0.000 | 0.50 | | |
| 15 | 9.002 | 3.35 | 1.564 | 60.7 |
| 16 | −39.060 | 1.00 | 1.804 | 39.6 |
| 17 | 5.900 | 2.90 | | |
| 18 | −13.735 | 1.90 | 1.785 | 25.7 |
| 19 | −5.202 | 1.00 | 1.640 | 60.1 |
| 20 | 15.201 | 136.30 | | |
| 21 | 75.043 | 5.10 | 1.623 | 57.0 |
| 22 | −75.043 | 2.00 | 1.750 | 35.2 |
| 23 | 1600.580 | 7.50 | | |

TABLE 5-continued

| 24 | 50.256 | 5.10 | 1.668 | 42.0 |
|---|---|---|---|---|
| 25 | −84.541 | 1.80 | 1.613 | 44.4 |
| 26 | 36.911 | 5.50 | | |
| 27 | 0.000 | 30.00 | 1.569 | 56.0 |
| 28 | 0.000 | 143.82 | | |

Diffractive optical surface data

| Twelfth surface κ = 1 | A2 = −5.6000E−08 | A4 = 3.2897E−10 |
|---|---|---|
| | A6 = −4.1539E−12 | A8 = 2.0125E−14 |

Values corresponding to conditions (1) Left side
     $|\theta|$ (Zero order) = 0.91 [°]
     $|\theta|$ (Second order) = 0.90 [°]
   Right side = 0.57 [°]
(2) Left side
     $|\delta\theta|$ (Zero order-First order) = 0.39 [°]
     $|\delta\theta|$ (Second order-First order) = 0.39 [°]
   Right side = 0.26 [°]
(2') Right side = 0.23 [°]

In this way, it is seen that both the conditional expressions (1) and (2) are satisfied in the fourth example. FIG. 11 shows spot diagrams of spots formed by the zero-order diffracted light and the second-order diffracted light (unnecessary-order diffracted light) in the fourth example. As shown in FIG. 11, each of the spots formed by the zero-order diffracted light and the second-order diffracted light, each of which is unnecessary-order diffracted light, has a height, of 2.0 mm or more from the optical axis of the spot. Therefore, in the microscope optical system MS4 according to the fourth example, the flare formed on the image surface by the zero-order diffracted light and the second-order diffracted light can be made inconspicuous.

Fifth Example

Next, a microscope optical system MS5 shown in FIG. 12 is described as a fifth example. The microscope optical system MS5 is also configured by, in order from the object side, an objective lens OL, a second objective lens IL, and a prism PR. Further, the objective lens OL is configured by, in order from the object, side, a first lens group G1, a diffractive optical element GD, and a second lens group G2. Further, the first, lens group G1 is configured by, in order from the object, side, a positive meniscus lens L1 whose concave surface is directed to the object side, a cemented lens formed by bonding together a biconvex lens L2 and a negative meniscus lens L3 whose concave surface is directed to the object, side, a biconvex lens L4, and a cemented lens formed by bonding together a biconvex lens L5, a biconcave lens L6, and a positive meniscus lens L7 whose convex surface is directed to the object, side. Further, in the diffractive optical element GD, a plate-shaped optical glass L8, two optical members L9 and L10 which are respectively formed of different, resin materials, and a plate-shaped optical glass L11 are bonded together in this order from the object, side, and a diffraction grating pattern (diffractive optical surface) is formed on the bonded surface of the optical members L9 and L10. That is, the diffractive optical element GD is a contact multi-layered diffractive optical element. Further, the second lens group G2 is configured by, in order from the object side, a cemented lens formed by bonding together a biconvex lens L12 and a biconcave lens L13, and a cemented lens formed by bonding together a biconcave lens L14, a biconvex lens L15, and a biconcave lens L16. Further, the second objective lens IL is configured by, in order from the object, side, a cemented lens formed by bonding together a biconvex lens L17 and a biconcave lens L18, and a cemented lens formed by bonding together a biconvex lens L19 and a biconcave lens L20. Note that both ends of the prism PR are configured by planar optical glass.

Table 6 shows specifications of the microscope optical system MS5 according to the fifth example shown in FIG. 12. The surface numbers shown in Table 6 respectively correspond to the surface numbers 1 to 32 shown in FIG. 12.

TABLE 6 f = 4
f1 = −5.09
f2 = 200
β = 50×
NA (Object side) = 0.4
NA (Image side) = 0.008
d0 = 22.51
D = 3.2
hdoe = 4.56
θdoe = 19.10 [°]

| m | r | d | nd | νd |
|---|---|---|---|---|
| 1 | −120.028 | 3.40 | 1.697 | 55.5 |
| 2 | −20.743 | 0.15 | | |
| 3 | 37.941 | 5.35 | 1.498 | 82.5 |
| 4 | −21.400 | 1.00 | 1.720 | 34.7 |
| 5 | −39.959 | 0.15 | | |
| 6 | 24.558 | 3.70 | 1.603 | 65.5 |
| 7 | −143.315 | 0.15 | | |
| 8 | 16.120 | 4.35 | 1.498 | 82.5 |
| 9 | −47.354 | 1.00 | 1.804 | 39.6 |
| 10 | 9.766 | 3.20 | 1.498 | 82.5 |
| 11 | 38.999 | 1.20 | | |
| 12 | 0.000 | 2.50 | 1.517 | 64.1 |
| 13 | 0.000 | 0.06 | 1.528 | 34.7 |
| 14 | 0.000 | 0.00 | 10001.000 | −3.5 |
| 15* | 0.000 | 0.06 | 1.557 | 50.2 |
| 16 | 0.000 | 3.00 | 1.517 | 64.1 |
| 17 | 0.000 | 0.20 | | |
| 18 | 7.350 | 2.80 | 1.498 | 82.5 |
| 19 | −42.071 | 1.00 | 1.804 | 39.6 |
| 20 | 7.151 | 3.90 | | |
| 21 | −10.484 | 0.90 | 1.729 | 54.7 |
| 22 | 5.488 | 2.40 | 1.741 | 27.8 |
| 23 | −3.461 | 0.90 | 1.624 | 47.0 |
| 24 | 5.396 | 100.00 | | |
| 25 | 75.043 | 5.10 | 1.623 | 57.0 |
| 26 | −75.043 | 2.00 | 1.750 | 35.2 |
| 27 | 1600.580 | 7.50 | | |

TABLE 6-continued

| | | | | |
|---|---|---|---|---|
| 28 | 50.256 | 5.10 | 1.668 | 42.0 |
| 29 | −84.541 | 1.80 | 1.613 | 44.4 |
| 30 | 36.911 | 5.50 | | |
| 31 | 0.000 | 30.00 | 1.569 | 56.0 |
| 32 | 0.000 | 143.82 | | |

Diffractive optical surface data

| | | |
|---|---|---|
| Fifteenth surface κ = 1 | A2 = −5.5556E−08 | A4 = −9.0940E−14 |
| | A6 = −3.0689E−12 | A8 = 1.7287E−15 |

Values corresponding to conditions

| | |
|---|---|
| (1) | Left side |
| | \|θ\| (Zero order) = 1.20 [°] |
| | \|θ\| (Second order) = 1.23 [°] |
| | Right side = 1.07 [°] |
| (2) | Left side |
| | \|δθ\| (Zero order-First order.) = 0.39 [°] |
| | \|δ\| (Second order-First order) = 0.39 [°] |
| | Right side = 0.37 [°] |
| (2') | Right side = 0.33 [°] |

Figure 13A:
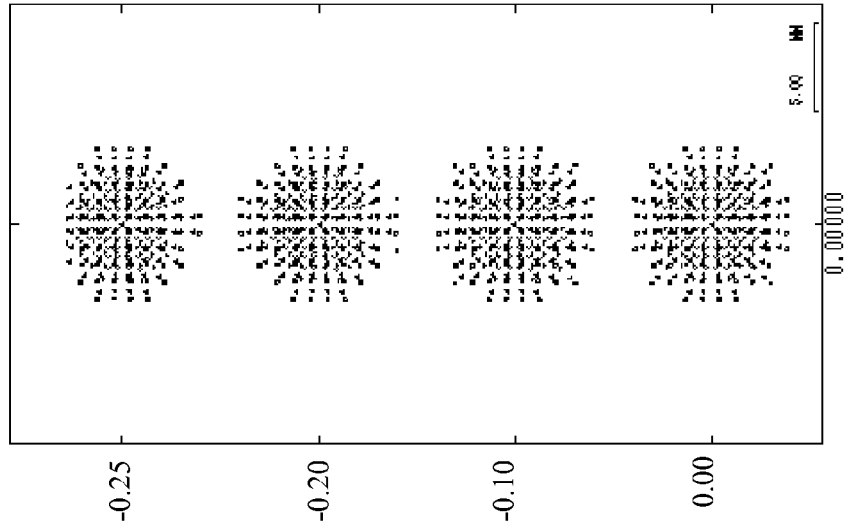
FIG. 13(a) shows the zero-order diffracted light and FIG. 13(b) shows the second-order diffracted light.
Figure 13B:
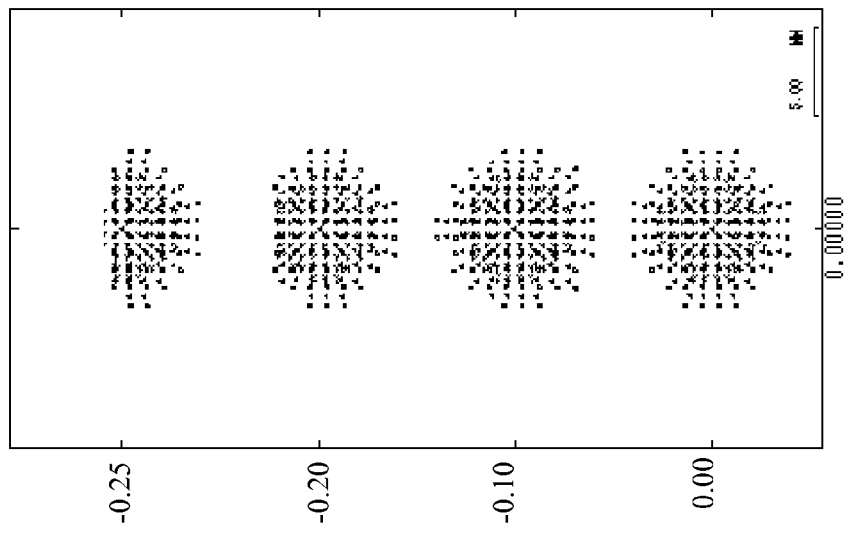

In this way, it is seen that both the conditional expressions (1) and (2) are satisfied in the fifth example. Further, FIG. 13 shows spot, diagrams of spots formed by the zero-order diffracted light and the second-order diffracted light (unnecessary-order diffracted light) in the fifth example. As shown in FIG. 13, each of the spots formed by the zero-order diffracted light and the second-order diffracted light, each of which is unnecessary-order diffracted light, has a height of 3.75 mm or more from the optical axis of the spot. Therefore, in the microscope optical system MS5 according to the fifth example, the flare formed on the image surface by the zero-order diffracted light and the second-order diffracted light can be made inconspicuous.

Sixth Example

Finally, a microscope optical system MS6 shown in FIG. 14 is described as a sixth example. The microscope optical system MS6 is also configured by, in order from the object side, an objective lens OL, a second objective lens IL, and a prism PR. Further, the objective lens OL is configured by, in order from the object side, a first lens group G1, a diffractive optical element GD, and a second lens group G2. Further, the first lens group G1 is configured by, in order from the object side, a positive meniscus lens L1 whose concave surface is directed to the object side, a plano-convex lens L2 whose planar surface is directed to the object-side, and a cemented lens formed by bonding together a biconvex lens L3 and a negative meniscus lens L4 whose concave surface is directed to the object side, a cemented lens formed by bonding together a biconvex lens L5, a biconcave lens L6, and a biconvex lens L7, and a cemented lens formed by bonding together a biconvex lens L8 and a biconcave lens L9. Further, in the diffractive optical element GD, a plate-shaped optical glass L10, two optical members L11 and L12 which are respectively formed of different resin materials, and a plate-shaped optical glass L13 are bonded together in this order from the object, side, and a diffraction grating pattern (diffractive optical surface) is formed on the bonded surface of the optical members L11 and L12. That, is, the diffractive optical element GD is a contact multi-layered diffractive optical element. Further, the second lens group G2 is configured by, in order from the object side, a cemented lens formed by bonding together a negative meniscus lens L14 whose convex surface is directed to the object side, a biconvex lens L15, and a biconcave lens L16, and a cemented lens formed by bonding together a biconcave lens L17, a biconvex lens L18, and a biconcave lens L19. Further, the second objective lens IL is configured by, in order from the object side, a cemented lens formed by bonding together a biconvex lens L20 and a biconcave lens L21, and a cemented lens formed by bonding together a biconvex lens L22 and a biconcave lens L23. Note that both ends of the prism PR are configured by planar optical glass.

Table 7 shows specifications of the microscope optical system MS6 according to the sixth example shown in FIG. 14. The surface numbers shown in Table 7 respectively correspond to the surface numbers 1 to 36 shown in FIG. 14.

TABLE 7 f = 2
f1 = −3.54
f2 = 200
β = 100×
NA (Object side) = 0.6
NA (Image side) = 0.006
d0 = 12.18
D = 2.4
hdoe = 4.90
θdoe = 20.34 [°]

| m | r | d | nd | vd |
|---|---|---|---|---|
| 1 | −17.818 | 3.20 | 1.729 | 54.6 |
| 2 | −11.600 | 0.10 | | |
| 3 | 0.000 | 4.00 | 1.569 | 71.3 |
| 4 | −20.743 | 0.10 | | |
| 5 | 45.256 | 5.90 | 1.498 | 82.6 |
| 6 | −19.170 | 1.20 | 1.613 | 44.3 |
| 7 | −39.808 | 0.10 | | |
| 8 | 29.510 | 4.60 | 1.498 | 82.6 |
| 9 | −33.847 | 1.20 | 1.613 | 44.3 |
| 10 | 13.735 | 4.70 | 1.498 | 82.6 |
| 11 | −80.931 | 0.20 | | |
| 12 | 15.883 | 3.90 | 1.498 | 82.6 |
| 13 | −38.548 | 1.00 | 1.723 | 38.0 |
| 14 | 38.548 | 1.20 | | |
| 15 | 0.000 | 2.50 | 1.517 | 63.9 |
| 16 | 0.000 | 0.06 | 1.528 | 34.7 |
| 17 | 0.000 | 0.00 | 10001.000 | −3.5 |

TABLE 7-continued

| | | | | |
|---|---|---|---|---|
| 18* | 0.000 | 0.06 | 1.557 | 50.2 |
| 19 | 0.000 | 3.00 | 1.517 | 63.9 |
| 20 | 0.000 | 0.20 | | |
| 21 | 8.410 | 1.30 | 1.694 | 53.2 |
| 22 | 4.811 | 3.50 | 1.434 | 95.0 |
| 23 | −20.594 | 1.00 | 1.673 | 32.2 |
| 24 | 6.950 | 5.20 | | |
| 25 | −10.080 | 1.00 | 1.788 | 47.4 |
| 26 | 11.276 | 1.80 | 1.847 | 23.8 |
| 27 | −3.092 | 0.70 | 1.694 | 53.2 |
| 28 | 4.719 | 140.50 | | |
| 29 | 75.043 | 5.10 | 1.623 | 57.0 |
| 30 | −75.043 | 2.00 | 1.750 | 35.2 |
| 31 | 1600.580 | 7.50 | | |
| 32 | 50.256 | 5.10 | 1.668 | 42.0 |
| 33 | −84.541 | 1.80 | 1.613 | 44.4 |
| 34 | 36.911 | 5.50 | | |
| 35 | 0.000 | 30.00 | 1.569 | 56.0 |
| 36 | 0.000 | 143.82 | | |

Diffractive optical surface data

| | | |
|---|---|---|
| Eighteenth surface κ = 1 | A2 = −4.1167E−08 | A4 = −8.5221E−11 |
| | A6 = −7.6001E−14 | A8 = −3.0526E−17 |

Values corresponding to conditions (1) Left side
    $|\theta|$ (Zero order) = 1.54 [°]
    $|\theta|$ (Second order) = 1.48 [°]
   Right side = 1.43 [°]
(2) Left side
    $|\delta\theta|$ (Zero order-First order.) = 0.32 [°]
    $|\delta\theta|$ (Second order-First order) =0.32 [°]
   Right side = 0.34 [°]
(2') Right side = 0.30 [°]

Figure 15B:
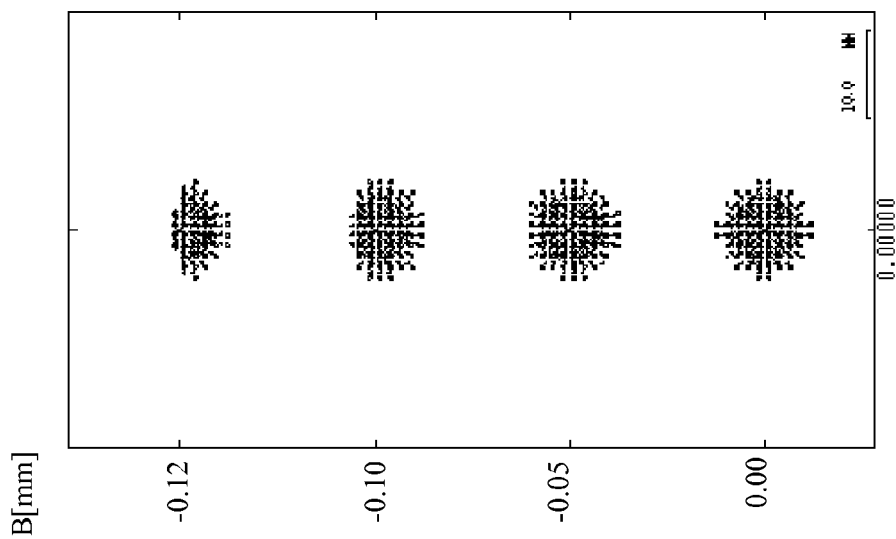
FIG. 15(a) shows the zero-order diffracted light and FIG. 15(b) shows the second-order diffracted light.
Figure 15A:
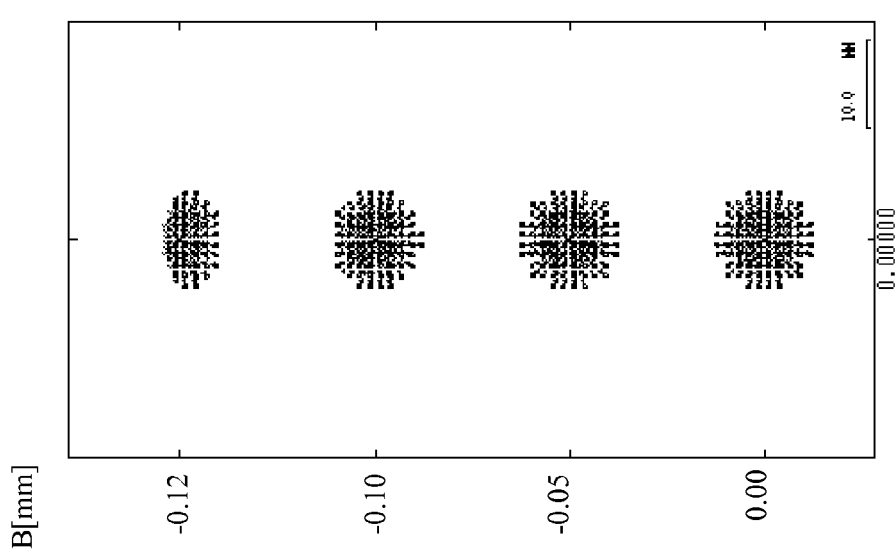

In this way, it is seen that both the conditional expressions (1) and (2') are satisfied in the sixth example. However, the conditional expression (2) is not satisfied. This is because of the aberration. FIG. 15 shows spot diagrams of spots formed by the zero-order diffracted light and the second-order diffracted light (unnecessary-order diffracted light) in the sixth example. As shown in FIG. 15, each of the spots formed by the zero-order diffracted light and the second-order diffracted light, each of which is unnecessary-order diffracted light, has a height of 5.00 mm or more from the optical axis of the spot. Therefore, in the microscope optical system MS6 according to the sixth example, the flare formed on the image surface by the zero-order diffracted light and the second-order diffracted light can be made inconspicuous.

REFERENCE SIGNS LIST

MS Microscope optical system
OL Objective lens
IL Second objective lens
G1 First lens group
GD Diffractive optical element
G2 Second lens group
1 Microscope system
10 Stage
17 First illumination optical system
18 Second illumination optical system

The invention claimed is:
1. A microscope optical system comprising: an objective lens which has a diffractive optical element and converts light from an object into a substantially parallel light flux; and a second objective lens which forms an image of the object by focusing the substantially parallel light flux from the objective lens, wherein in case where an m-th order diffracted light from the diffractive optical element is used for the image formation, the following expression is satisfied:

$|\theta| > \tan^{-1}(0.06/D)$      [Expression 10]

when the light of a maximum NA emitted from the object located on an optical axis enters the diffractive optical element, where θ is the incident angle on the second objective lens of the diffracted light having an order of diffraction different from the order of the m-th order diffracted light from the diffractive optical element, and D [mm] is a diameter of an entrance pupil to the second objective lens.

2. A microscope optical system comprising: an objective lens which has a diffractive optical element and converts light from an object into a substantially parallel light flux; and a second objective lens which forms an image of the object by focusing the substantially parallel light flux from the objective lens, wherein
the following expression is satisfied:

[Expression 11]

$$|\delta\theta| > \left| \frac{0.054}{hdoe} \frac{f1}{D} \cos(\theta doe)\sin(\theta doe) \right|$$

where, among a plurality of orders of diffracted light from the diffractive optical element when the light of a maximum NA emitted from the object located on an optical axis enters the diffractive optical element,
δθ is a difference between an output angle of an necessary-order diffracted light used for the image formation and an output angle of an unnecessary-order diffracted light;

h is a height at which the necessary-order diffracted light used for the image formation exits; θdoe is an output angle of the necessary-order diffracted light used for the image formation; D [mm] is a diameter of an entrance pupil to the second objective lens; and f1 is a focal length of the group of lenses, which are included in the objective lens, which are arranged on an image side from the diffractive optical element.

3. The microscope optical system according to claim 1, wherein the diffractive optical element is a contact multi-layered diffractive optical element.

4. The microscope optical system according to claim 1, wherein a diffraction grating pattern of the diffractive optical element is formed on a bonded surface of resin layers each having a different refractive index and each of the resin layers is arranged on a planar substrate.

5. The microscope optical system according to claim 1, wherein the group of lenses, which are included in the objective lens, which are arranged on the image side from the diffractive optical element, have negative refractive power.

6. A microscope system comprising:

a stage on which an object is mounted;

an illumination optical system which illuminates the object; and the microscope optical system according to claim 1, which forms an image of the object.

7. The microscope optical system according to 2, wherein the diffractive optical element is a contact multi-layered diffractive optical element.

8. The microscope optical system according to claim 2, wherein a diffraction grating pattern of the diffractive optical element is formed on a bonded surface of resin layers each having a different refractive index and each of the resin layers is arranged on a planar substrate.

9. The microscope optical system according to claim 2, wherein the group of lenses, which are included in the objective lens, which are arranged on the image side from the diffractive optical element, have negative refractive power.

10. A microscope system comprising:

a stage on which an object is mounted;

an illumination optical system which illuminates the object; and the microscope optical system according to claim 2, which forms an image of the object.

* * * * *